US008489879B2

(12) United States Patent
Sugiyama

(10) Patent No.: US 8,489,879 B2
(45) Date of Patent: Jul. 16, 2013

(54) APPARATUS, METHOD, PROGRAM, AND SYSTEM FOR INFORMATION PROCESSING

(75) Inventor: Hirokazu Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 349 days.

(21) Appl. No.: 12/651,676

(22) Filed: Jan. 4, 2010

(65) Prior Publication Data

US 2010/0172499 A1 Jul. 8, 2010

(30) Foreign Application Priority Data

Jan. 8, 2009 (JP) ................................. 2009-002782

(51) Int. Cl.
*H04L 9/32* (2006.01)
(52) U.S. Cl.
USPC .......................................... 713/171; 370/277
(58) Field of Classification Search
None
See application file for complete search history.

(56) References Cited

U.S. PATENT DOCUMENTS

| | | | | |
|---|---|---|---|---|
| 6,965,992 | B1 * | 11/2005 | Joseph et al. ................. | 713/153 |
| 7,159,243 | B1 * | 1/2007 | Muhlberger et al. ........... | 726/21 |
| 2002/0129172 | A1 | 9/2002 | Baskey et al. | |
| 2002/0146119 | A1 | 10/2002 | Liss | |
| 2004/0255145 | A1 * | 12/2004 | Chow ........................... | 713/200 |
| 2009/0101707 | A1 * | 4/2009 | Kurasaki et al. ............... | 235/380 |
| 2009/0327758 | A1 * | 12/2009 | Sakanaka et al. ............. | 713/193 |
| 2010/0031062 | A1 * | 2/2010 | Nishihara et al. ............. | 713/193 |
| 2010/0153749 | A1 * | 6/2010 | Sakai ........................... | 713/193 |

FOREIGN PATENT DOCUMENTS

| | | |
|---|---|---|
| JP | 2007-087120 | 4/2007 |
| WO | 02/44858 A2 | 6/2002 |

OTHER PUBLICATIONS

Manavski, S., "CUDA compatible GPU as an efficient hardware accelerator for AES cryptography", Nov. 24-27, 2007, IEEE International Conference on Signal Processing and Communications (ICSPC 2007), pp. 65-68.*
Anonymous, "Public-key cryptography", Wikipedia, the free encyclopedia, Dec. 19, 2008, pp. 1-13.
European Search Report issued Dec. 28, 2011, for corresponding European Appln. No. 09015582.1.

* cited by examiner

*Primary Examiner* — William Goodchild
*Assistant Examiner* — Carlos Amorin
(74) *Attorney, Agent, or Firm* — K&L Gates LLP

(57) ABSTRACT

Provided is an information processing apparatus including a communication unit for communication with an external apparatus, an operating system running unit for running first and second operating systems, the first for communication via a first communication path under a first communication protocol, and the second for communication via a second communication path under a second communication protocol. The apparatus includes a storage including first and second data areas for the operating systems, and a shared area for both operating systems. A first encryption key is stored in the first area for first protocol communication. The first operating system encrypts the communication via the first path by the first key, acquires, from the external apparatus via the first path, a second encryption key for second protocol communication, and stores the second key into the shared area. The second operating system transfers the second key to the second data area.

9 Claims, 20 Drawing Sheets

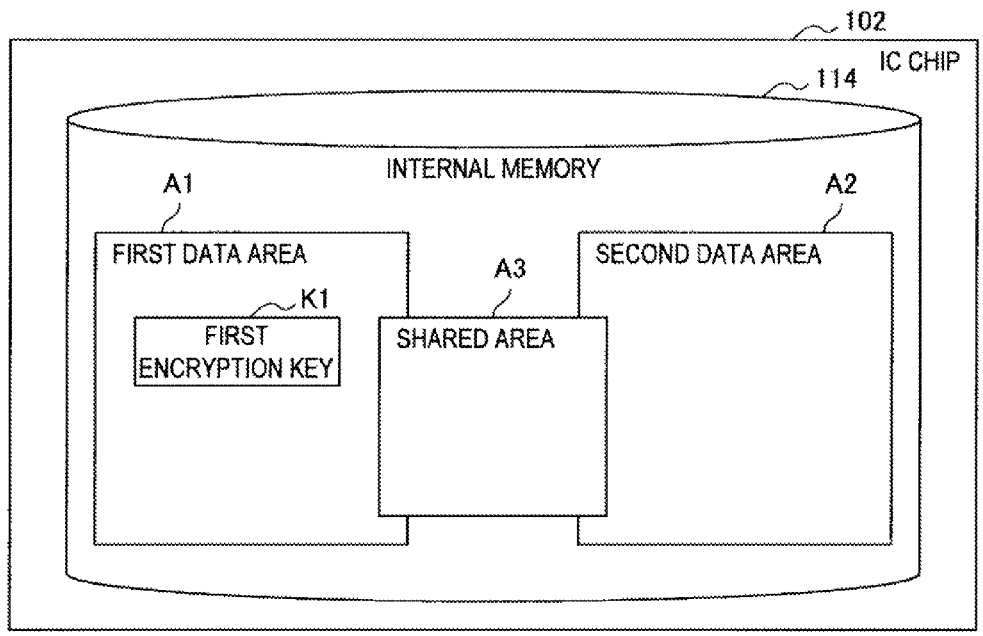
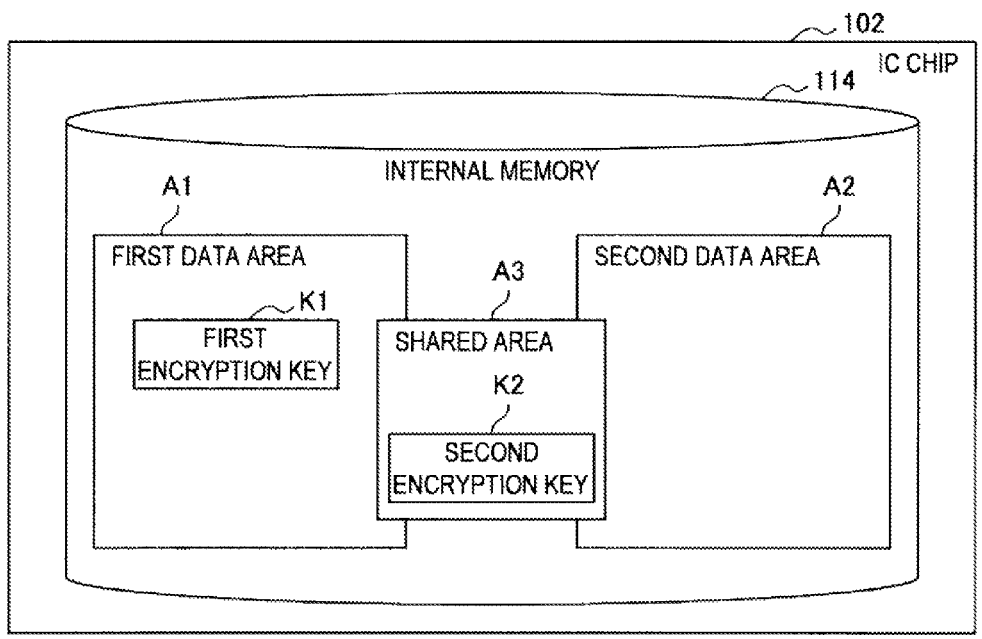

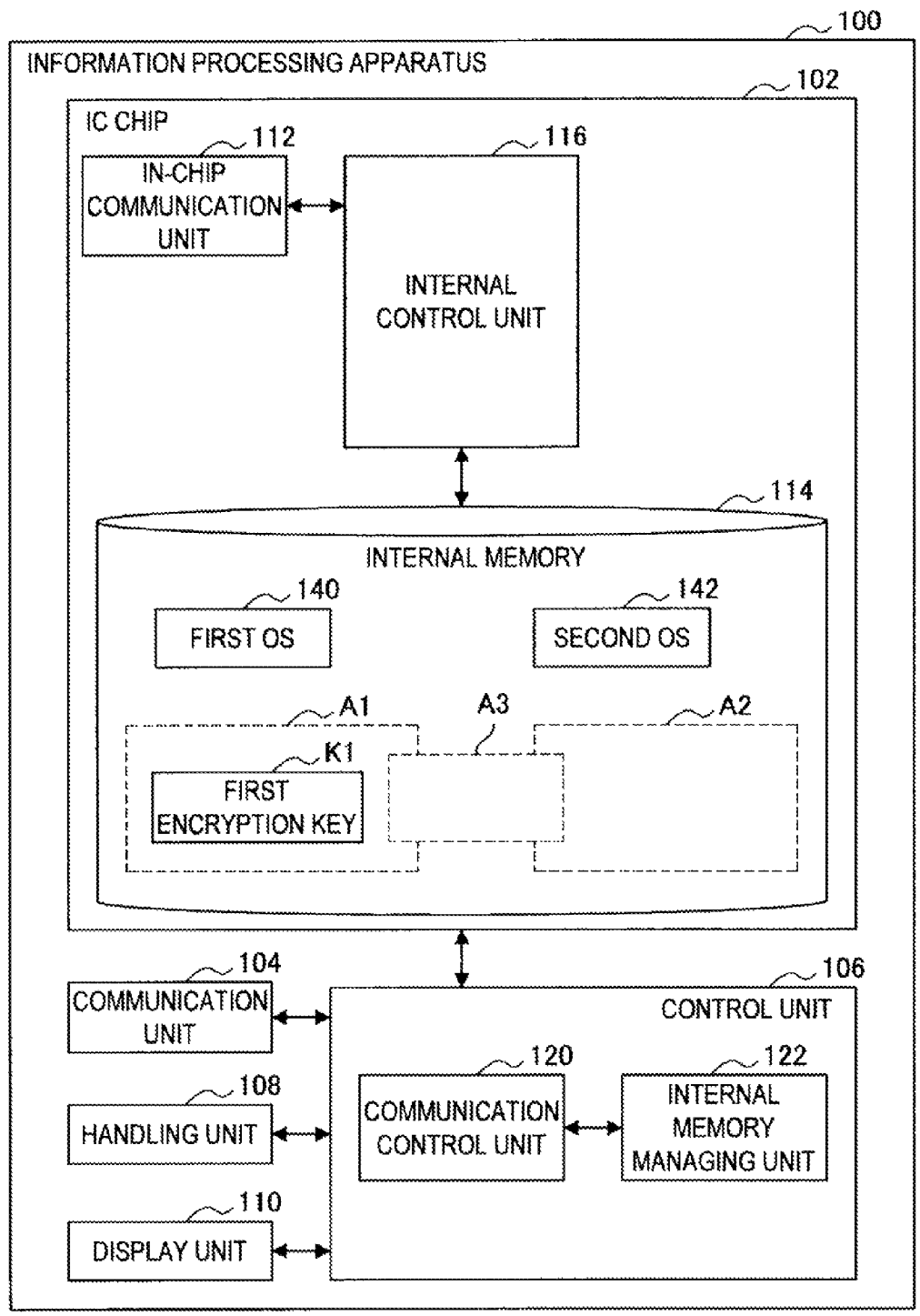

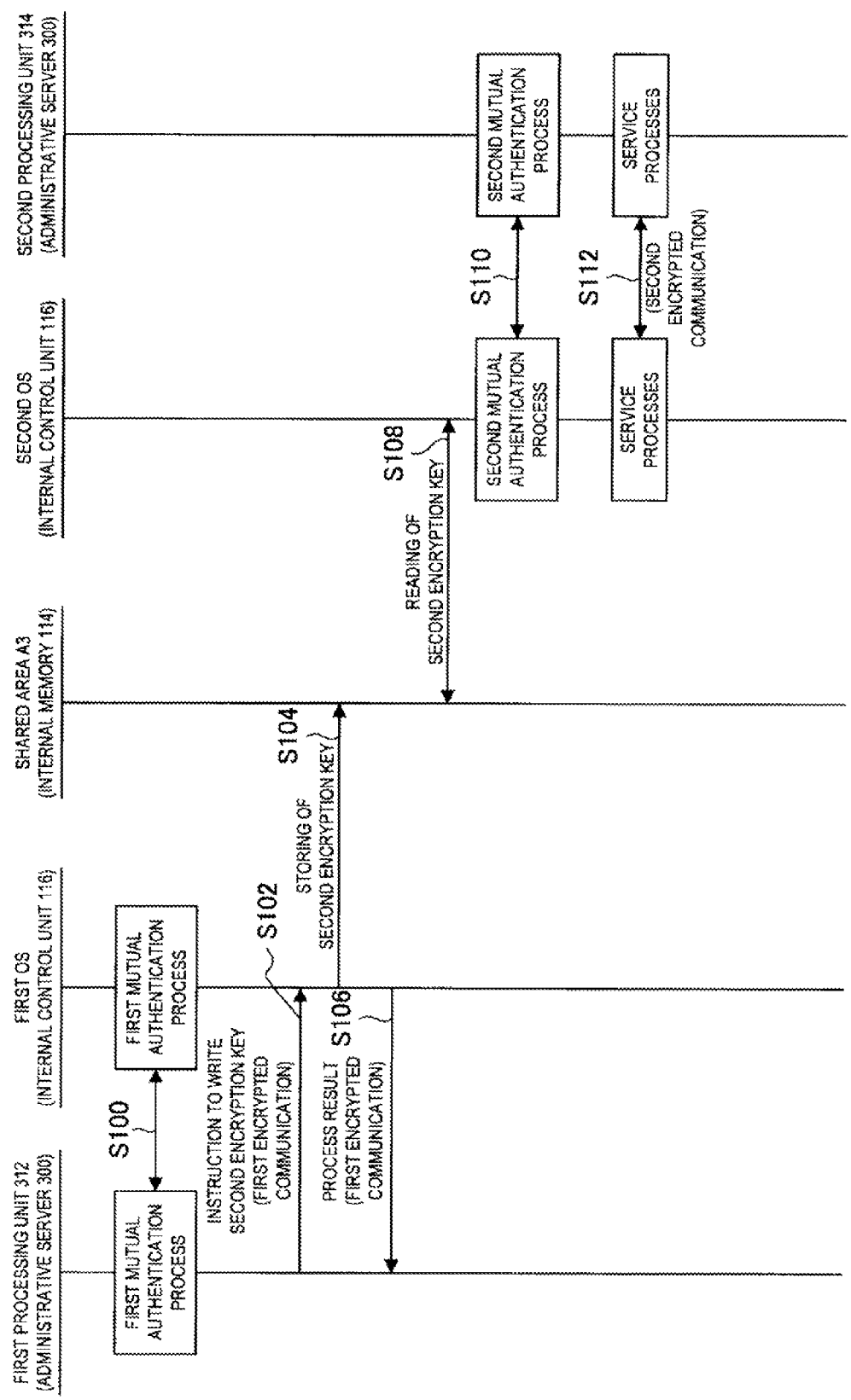

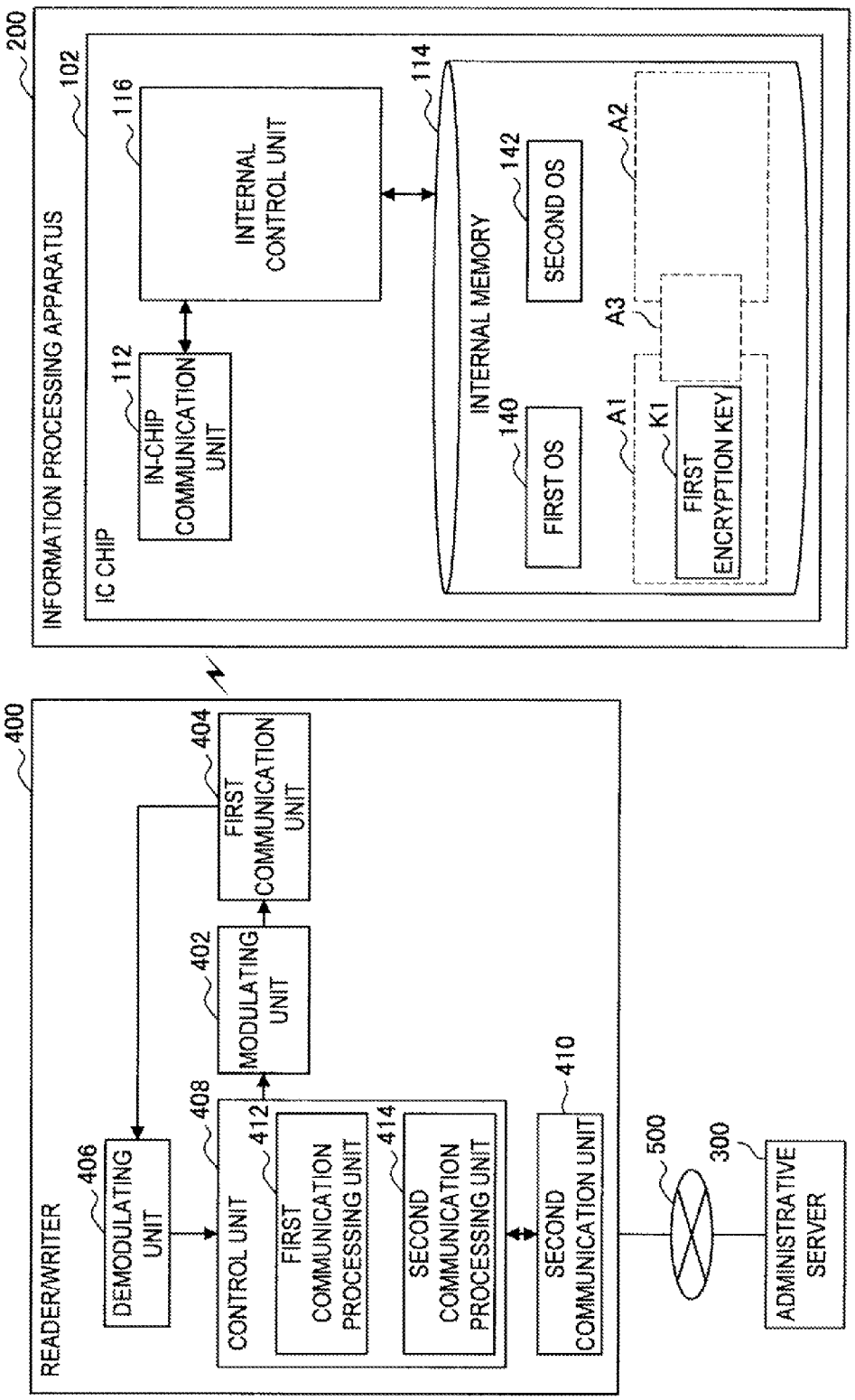

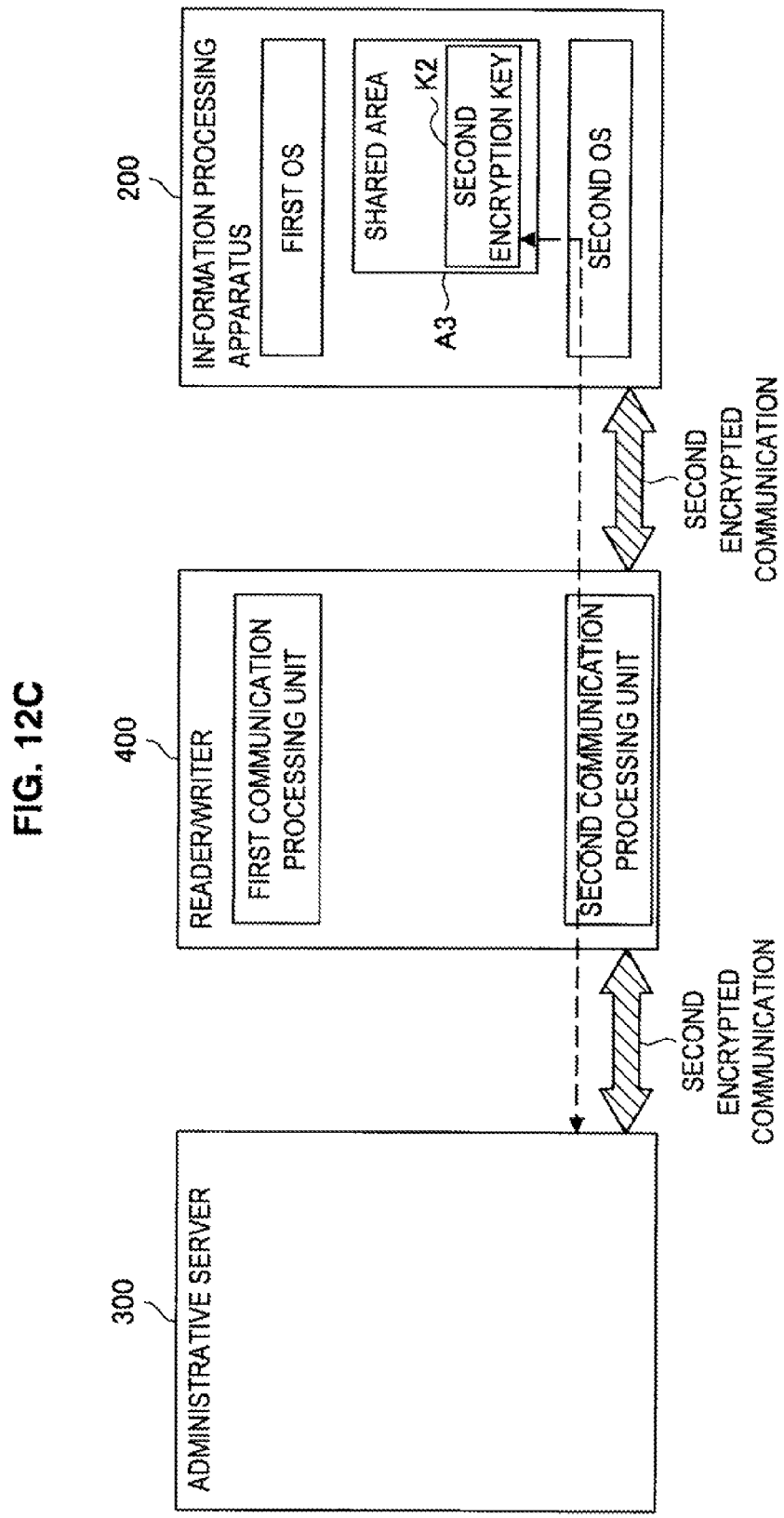

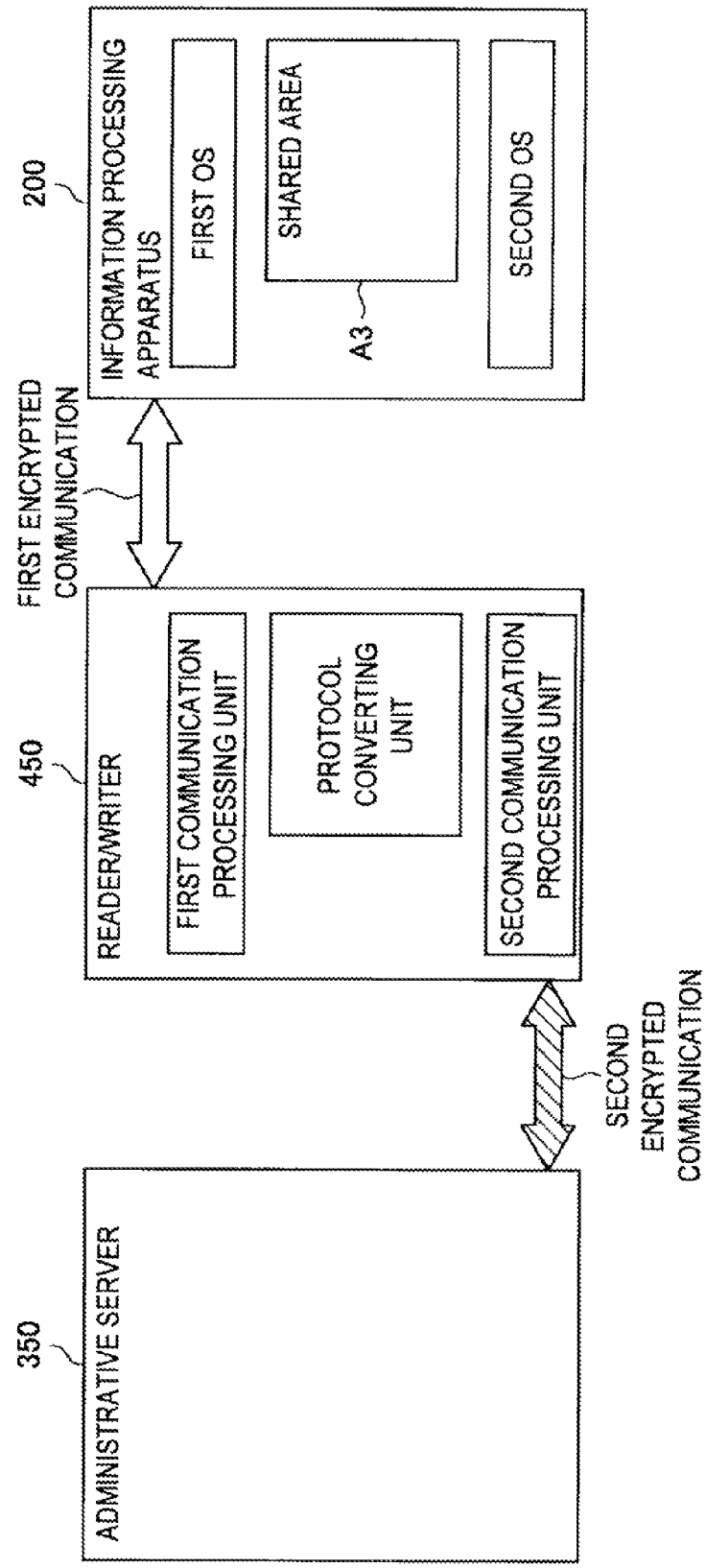

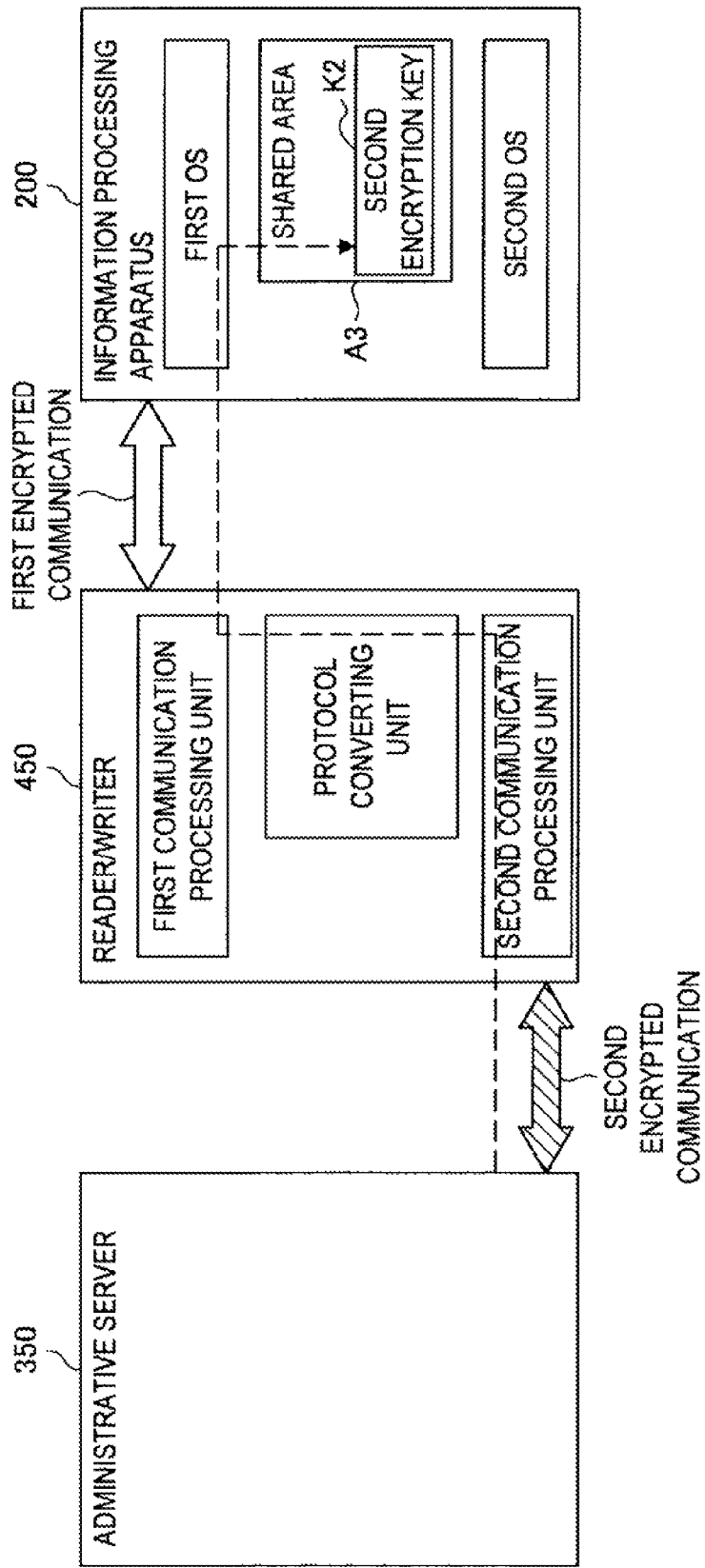

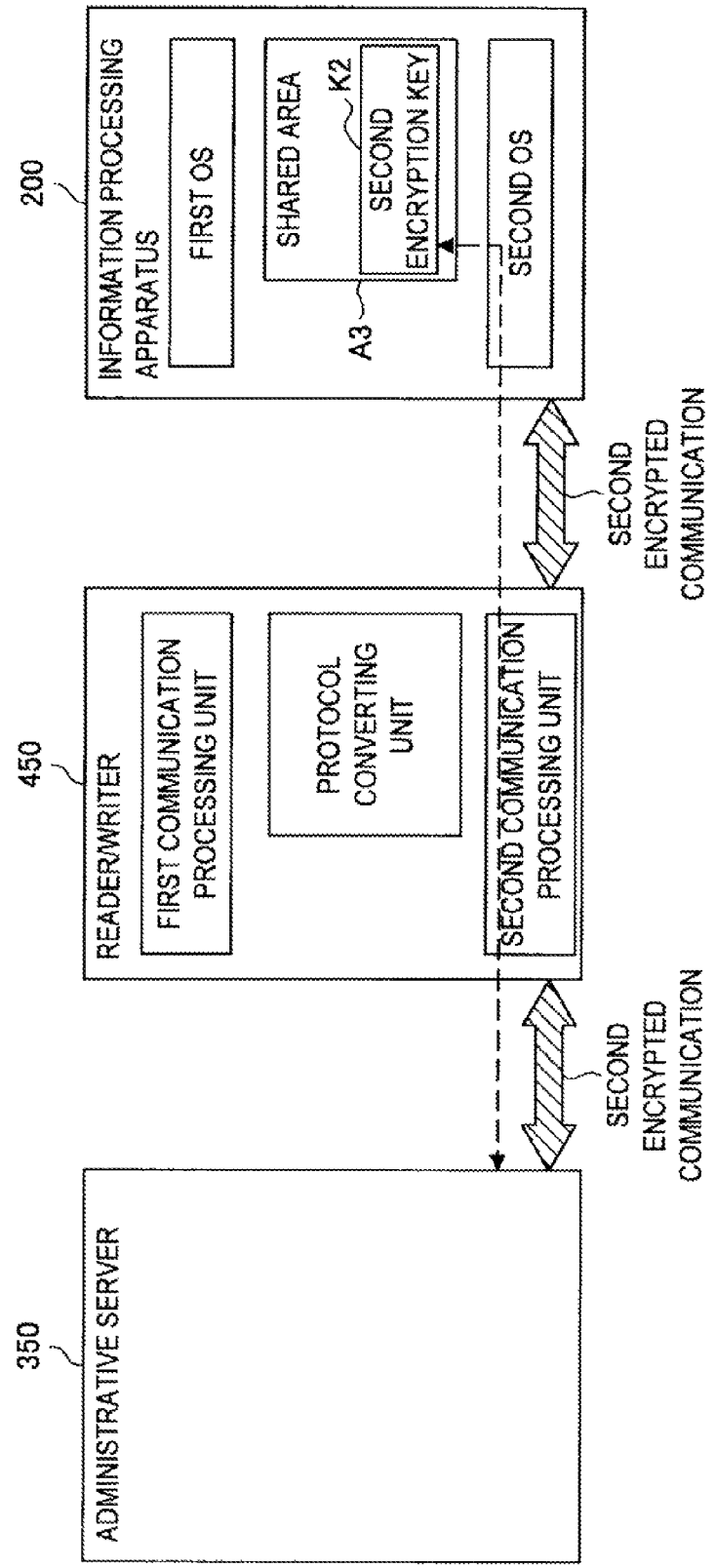

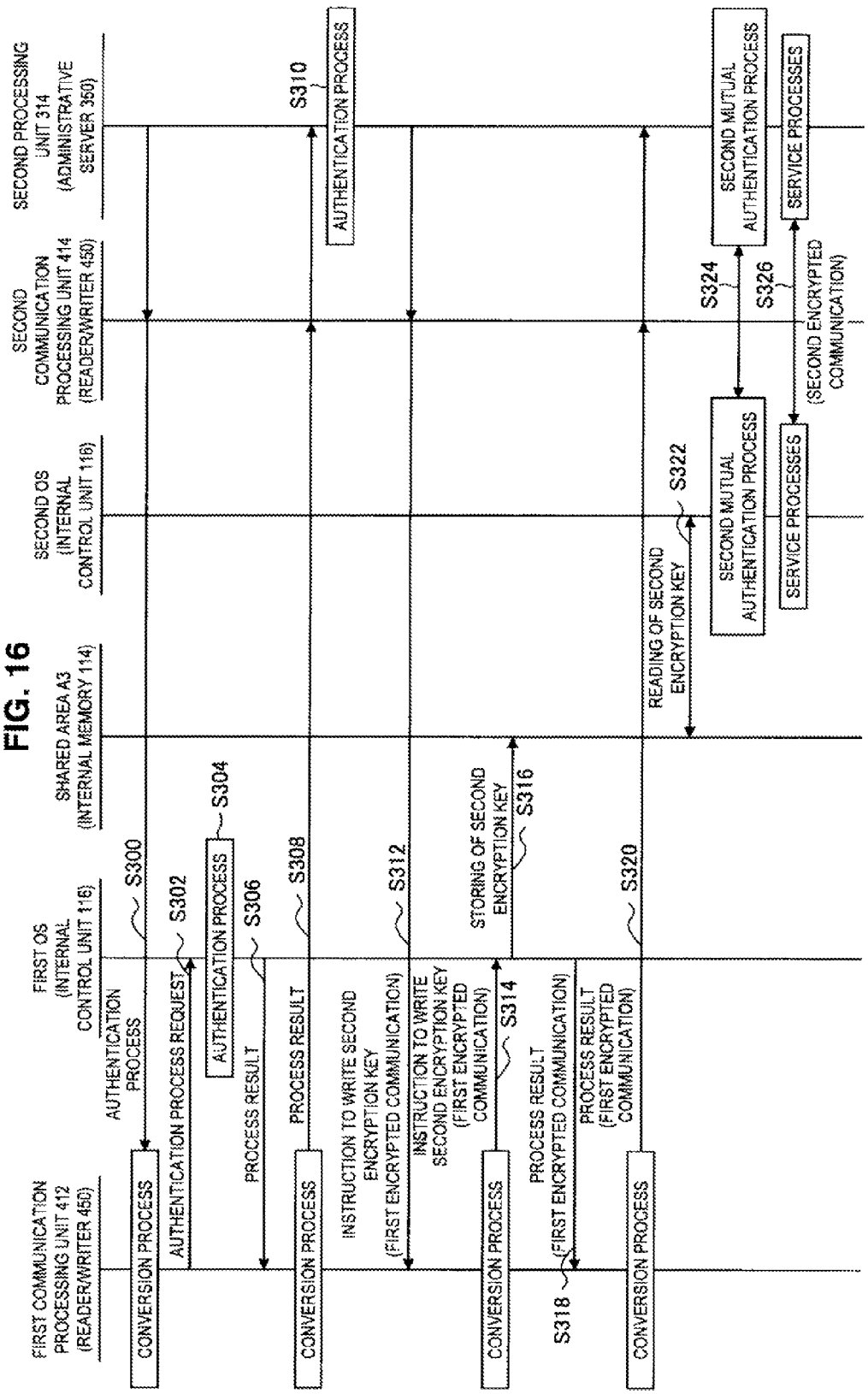

APPARATUS, METHOD, PROGRAM, AND SYSTEM FOR INFORMATION PROCESSING

CROSS REFERENCES TO RELATED APPLICATIONS

The present application claims priority to Japanese Priority Patent Application JP 2009-002782 filed in the Japan Patent Office on Jan. 8, 2009, the entire content of which is hereby incorporated by reference.

BACKGROUND

The present disclosure relates to an information processing apparatus, an information processing method, a program, and an information processing system.

In recent years, information processing apparatuses which are capable of noncontact communication with a reader/writer (or an apparatus with the reader/writer function) have become popular. Such readers/writers (or such apparatuses with the reader/writer function) includes noncontact IC (Integrated Circuit) cards, RFID (Radio Frequency Identification) tags, and mobile phones with noncontact IC chips, for example.

A magnetic field to which a particular frequency, such as 13.56 MHz, is given (carrier) is used for communication between a reader/writer and an information processing apparatus, such as a noncontact IC (Integrated Circuit) card, a mobile phone, etc. Specifically, a reader/writer and an information processing apparatus may communicate with each other as follows: the reader/writer sends a carrier that carries a carrier signal, and the information processing apparatus receives the carrier, then the information processing apparatus responds to the received carrier signal by sending back a response signal generated by load modulation.

Moreover, for example, such information processing apparatuses that are capable of noncontact communication with readers/writers can safely send/receive and update data which would cause a terrible disaster if manipulated, such as electrical money, by including a tamper-resistant IC chip therein. Accordingly, various services by use of the information processing apparatuses with such IC chips installed therein have been widely provided in society. As the services are provided more and more widely, the information processing apparatuses, such as IC cards, mobile phones, etc., with noncontact IC chips installed therein have then become much more popular.

Furthermore, in recent years, more and more functions are given to the information processing apparatuses as described above. There have even appeared, for example, information processing apparatuses that are capable of both contact and noncontact communication, or that are capable of communication with external apparatuses in different multiple communication protocols.

In such circumstances, there have been developed techniques related to information processing apparatuses with multiple operating systems that compatible with different communication schemes. For example, JP 2007-087120 (A) describes a technique for multiple operating systems to delegate issuance processes to each other.

For example, an internal memory of an IC chip included in an information processing apparatus, such as an IC card, a mobile phone, etc., becomes accessible for a user, by processes, so-called issuance processes, carried out by, for example, a service provider firm which manages services via the IC chip. Now, the issuance processes are classified in multiple levels: 0th issuance, 1st issuance, 2nd issuance, for example. The 0th issuance is an initialisation process for initialising an internal memory by setting up an encryption key for encrypted communication, initialising a memory area, etc. And the 1st issuance is a process for defining a memory area in the internal memory for which the 0th issuance is made. Then the 2nd issuance is a process for writing service data for use in the services into the memory area defined by the 1st issuance. The 0th issuance of the issuance processes is a process for setting, onto the internal memory, information (data), such as the encryption key, which might cause a grave trouble if stolen by a malicious third party. Accordingly, the 0th issuance is at least made at somewhere enough secured, such as factories for manufacturing IC chips to be installed into IC card or mobile phones. Now, with the 0th issuance made already, the information processing apparatus may safely make the 1st issuance and 2nd issuance by communicating cryptographically with an administrative server for managing the issuance processes by use of the encryption key stored in the internal memory, for example.

On the other hand, in recent years, there exists a need for information processing apparatuses compatible with a particular communication scheme to get into compatibility with another new communication scheme (e.g., communication under a new communication protocol) even after 0th issuance. In order to meet the need, for example, the issuance processes may be executed on the internal memories of the IC chips included in the information processing apparatuses for the other communication scheme.

Now, for example, a way of meeting the need is to bring the information processing apparatuses to somewhere enough secured, such as factories, with the 0th issuances for them already made, to execute again the issuance processes on them. However, this way is not practical because the information processing apparatuses, such as IC cards, mobile phones, etc., which now belong to users, may need to be brought to factories.

Moreover, another way of meeting the need is, for example, to execute new issuance processes on the information processing apparatuses via contact/non-contact communication between the information processing apparatuses and external apparatuses, such as the administrative server. However, in this way, the information processing apparatuses may not be capable of encrypting the contact/non-contact communication between the external apparatuses and them because they have no encryption key for the other new communication scheme yet. Accordingly, if the new issuance processes are executed via the contact/non-contact communication between the information processing apparatuses and external apparatuses, newly set-up encryption keys might be stolen by a malicious third party.

According to a technique (which may be simply referred to as the "related art" hereinafter) related to an information processing apparatus with multiple operating systems (which will be referred to as "OS"s hereinafter) compatible with different communication schemes, issuance processes are delegated between the OSs provided with a common kernel. More specifically, the related art enables processes cooperating with each other between the OSs by use of the kernel. Then, the issuance processes are implemented by delegation between OSs, where an OS corresponding to issuance data received by one communication means handles the process based on the issuance data. Thus, according to the related art, one communication scheme by which communication may be implemented cryptographically is used for issuance processes on the other communication schemes. It might be possible to meet the above need by use of the related art.

However, in the related art, OSs depend upon each other because multiple OSs are in cooperation via a common kernel at any time. Thus, if an encryption key for a particular communication scheme is stolen by a malicious third party, an information processing apparatus according to the related art might suffer a wretched situation as follows, for example:

The malicious third party sends unauthorised issuance data for cracking to the related-art information processing apparatus, using the stolen encryption key;

In the related-art information processing apparatus, an OS corresponding to the unauthorised issuance data received handles issuance processes according to the unauthorised issuance data; and Amongst the OSs of the related-art information processing apparatus, the OS, by which the issuance processes according to the unauthorised issuance data have been handled, is then got cracked by the malicious third party.

As described above, in the related art, the OSs of the related-art information processing apparatus depend upon each other; thus, the possibility that such a wretched situation as described above arises should not be overlooked. Consequently, even by use of the related art, it is not expected safe deposit (safe setup) of an encryption key for a new communication scheme into the internal memory of an information processing apparatus. And furthermore, in the related art, even the OS on which the issuance processes are executed legitimately at a factory or the like may be cracked by a malicious third party by cracking as described above because multiple OSs are in cooperation via a common kernel at any time.

In light of the foregoing, it is desirable to provide an information processing apparatus, an information processing method, a program, and an information processing system, which are improved, and which can safely set up an encryption key via contact/non-contact communication with an external apparatus.

SUMMARY

According to an embodiment, there is provided an information processing apparatus that includes a communication unit for communication with an external apparatus. The information processing apparatus also includes an operating system running unit for running a first operating system and a second operating system, respectively. The first operating system processes the communication with the external apparatus via a first communication path formed under a first communication protocol. The second operating system processes the communication with the external apparatus via a second communication path formed under a second communication protocol. The information processing apparatus also includes a storage that includes a first data area from/into which the first operating system is allowed reading/writing data, a second data area from/into which the second operating system is allowed reading/writing data, and a shared area from/into which both of the first and second operating systems are allowed reading/writing data. A first encryption key is stored in the first data area for use in a first encrypted communication under the first communication protocol. The run first operating system encrypts the communication with the external apparatus via the first communication path by use of the first encryption key stored in the first data area, acquires, from the external apparatus via the first communication path, a second encryption key for use in a second encrypted communication under the second communication protocol, and stores the acquired second encryption key into the shared area. The run second operating system transfers, to the second data area, the second encryption key stored in the shared area.

According to such an arrangement, the encryption keys can be safely set up via contact/non-contact communication with the external apparatus.

The run second operating system may encrypt the communication with the external apparatus via the second communication path by use of the second encryption key transferred to the second data area, and communicate with the external apparatus via the second communication path.

The run second operating system may send a request for issuance processes to the external apparatus via the second communication path, so that the second data area may be initialised to be available for services.

The key length of the first encryption key may be longer than the key length of the second encryption key.

The information processing apparatus may be a portable communication apparatus.

The information processing apparatus may be an IC card.

According to another embodiment, there is provided an information processing method that includes the step of running a first operating system and a second operating system, respectively. The first operating system processing communication with an external apparatus via a first communication path formed under a first communication protocol. The second operating system processing the communication with the external apparatus via a second communication path formed under a second communication protocol. The information processing method also includes the step of acquiring, from the external apparatus via the first communication path, a second encryption key for use in a second encrypted communication under the second communication protocol by encrypting the communication with the external apparatus via the first communication path by use of a first encryption key under the first communication protocol, the first encryption key stored in a storage including a first data area from/into which the first operating system is allowed reading/writing data, a second data area from/into which the second operating system is allowed reading/writing data, and a shared area from/into which both of the first and second operating systems are allowed reading/writing data. The first encryption key is stored in the first data area. The information processing method also includes the steps of storing the acquired second encryption key into the shared area, and transferring, to the second data area, the second encryption key stored in the shared area.

By use of such a method, the encryption keys can be safely set up via contact/non-contact communication with the external apparatus.

According to yet another embodiment, there is provided a computer program product stored on a computer-readable medium that when executed by a processor causes a computer to execute the step of running a first operating system and a second operating system, respectively. The first operating system processing communication with an external apparatus via a first communication path formed under a first communication protocol. The second operating system processing the communication with the external apparatus via a second communication path formed under a second communication protocol. The program also cause the computer to execute the step of acquiring, from the external apparatus via the first communication path, a second encryption key for use in a second encrypted communication under the second communication protocol by encrypting the communication with the external apparatus via the first communication path by use of a first encryption key under the first communication protocol, the first encryption key stored in a storage including a first data area from/into which the first operating system is allowed reading/writing data, a second data area from/into which the second operating system is allowed reading/writing data, and a shared area from/into which both of the first and second operating systems are allowed reading/writing data. The first encryption key is stored in the first data area. The program also cause the computer to execute the steps of storing the acquired second encryption key into the shared area and of transferring, to the second data area, the second encryption key stored in the shared area.

By use of such a program, the encryption keys can be safely set up via contact/non-contact communication with the external apparatus.

According to yet another embodiment, there is provided an information processing system that includes a reader/writer, an administrative server operable to communicate with the reader/writer via a first communication path formed under a first communication protocol and a second communication path formed under a second communication protocol, and an information processing apparatus operable to communicate with the reader/writer via the first and second communication paths. The administrative server includes an administrative communication unit for communication between the administrative server and the reader/writer and an administrative storage for storing a first encryption key for a first encrypted communication under the first communication protocol and a second encryption key for a second encrypted communication under the second communication protocol. The information processing apparatus includes a communication unit for non-contact communication between the information processing apparatus and the reader/writer by use of a carrier at a predetermined frequency. The information processing apparatus also includes an operating system running unit for running a first operating system and a second operating system, respectively. The first operating system processes the non-contact communication via the first communication path. The second operating system processes the non-contact communication via the second communication path. The information processing apparatus also includes a storage that includes a first data area from/into which the first operating system is allowed reading/writing data, a second data area from/into which the second operating system is allowed reading/writing data, and a shared area from/into which both of the first and second operating systems are allowed reading/writing data. The first encryption key is stored in the first data area. The run first operating system encrypts the communication with the external apparatus via the first communication path by use of the first encryption key stored in the first data area, acquires the second encryption key from the administrative server through the reader/writer via the first communication path, and stores the acquired second encryption key into the shared area. The run second operating system transfers, to the second data area, the second encryption key stored in the shared area.

According to such an arrangement, the encryption keys can be safely set up via contact/non-contact communication with the external apparatus.

According to the embodiments described above, an encryption key can be safely set up via contact/non-contact communication with an external apparatus.

Additional features and advantages are described herein, and will be apparent from the following Detailed Description and the figures.

BRIEF DESCRIPTION OF THE FIGURES

FIG. 1 is an illustration for illustrating the overview of the encryption key setting-up approach according to the embodiments.

FIG. 2 is an illustration for illustrating the overview of the encryption key setting-up approach according to the embodiments.

FIG. 6 is an illustration that shows an example of the arrangement of an information processing apparatus according to the first embodiment.

FIG. 10 is an illustration that shows exemplary processes in an information processing system according to the first embodiment.

FIG. 11 is an illustration that shows an exemplary arrangement of an information processing system according to the second embodiment.

FIG. 12C is an illustration for illustrating the overview of the processes related to setting-up of the encryption keys in the information processing system according to the second embodiment.

FIG. 15A is an illustration for illustrating the overview of the processes related to setting-up of the encryption keys in the information processing system according to the third embodiment.

FIG. 15B is an illustration for illustrating the overview of the processes related to setting-up of the encryption keys in the information processing system according to the third embodiment.

FIG. 15C is an illustration for illustrating the overview of the processes related to setting-up of the encryption keys in the information processing system according to the third embodiment.

FIG. 16 is an illustration that shows exemplary processes in the information processing system according to the third embodiment.

DETAILED DESCRIPTION

Figure 3:
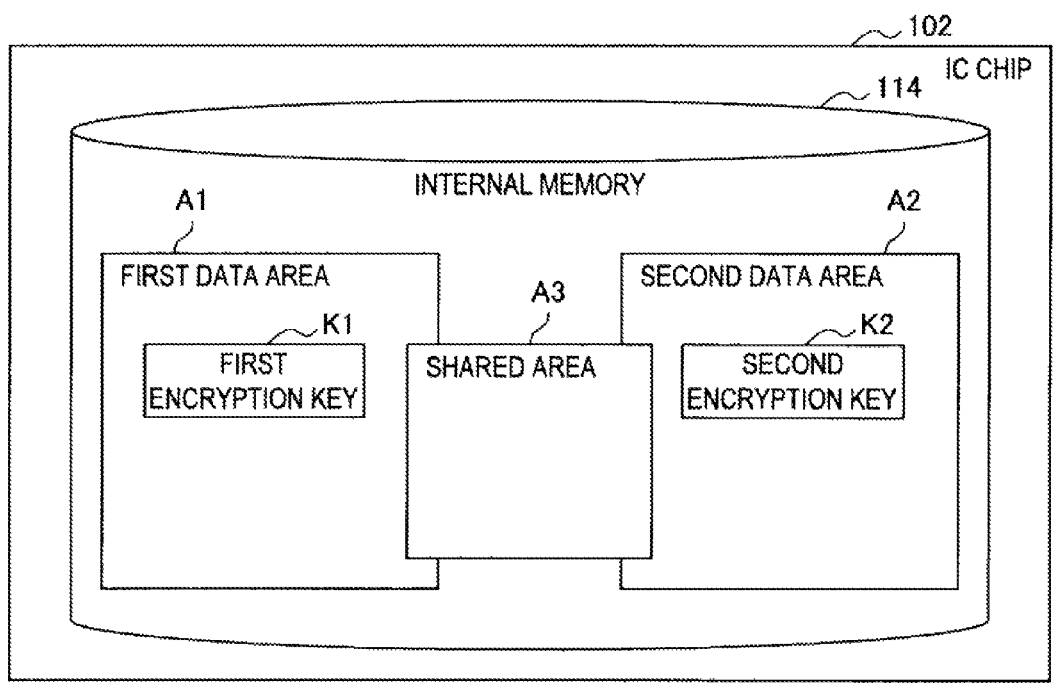
FIG. 3 is an illustration for illustrating the overview of the encryption key setting-up approach according to the embodiments

Hereinafter, embodiments will be described in detail with reference to the appended drawings. Note that, in this specification and the appended drawings, structural elements that have substantially the same function and structure are denoted with the same reference numerals, and repeated explanation of these structural elements is omitted.

The descriptions will be presented hereinafter in the order of:
1. Encryption Key Setting-up Approach According to Embodiments;
2. Information Processing System According to First Embodiment;
3. Program According to First Embodiment;
4. Information Processing System According to Second Embodiment;
5. Program According to Second Embodiment;
6. Information Processing System According to Third Embodiment; and
7. Program According to Third Embodiment.

(Encryption Key Setting-Up Approach According to Embodiments)

Before the arrangement of information processing systems (which may be collectively referred to as the "information processing systems 9000" hereinafter) according to first-third embodiments, an encryption key setting-up approach according to the embodiments will be described. And also, information processing apparatuses according to the embodiments included in the information processing systems 9000 may be collectively referred to as the "information processing apparatuses 900" hereinafter.

The explanation below will give an example arrangement of the information processing apparatus 900 with an IC chip which includes an tamper-resistant internal memory (storage), information processing apparatuses according to the embodiments are not limited to the arrangement with such an IC chip. For example, an information processing apparatus according to the embodiments may be implemented in any arrangements that are capable of preventing a third party from gaining information (data) which would cause a terrible catastrophe if stolen by them, such as an encryption key.

In the example arrangement of the explanation below, the information processing apparatus 900 includes a first operating system (which may be referred to as the "first OS" hereinafter) and a second operating system (which may be referred to as the "second OS" hereinafter): the first OS is an operating system for handling processes related to the communication between the information processing apparatus 900 and an external apparatus via a communication path (which will be referred to as the "first communication path" hereinafter) formed under a first communication protocol; and the second OS is an operating system for handling processes related to the communication between the information processing apparatus 900 and the external apparatus via another communication path (which will be referred to as the "second communication path" hereinafter) formed under a second communication protocol that is different from the first communication protocol. The first and second OSs according to the embodiments may be operating systems that do not depend upon each other, for example. Now, the OS according to the embodiments of the present invention may be FeliCa® OSs and MIFAIR® OSs according to the standards ISO/IEC18092, Java® OSs, etc., but they are not limited thereto. Besides, the information processing apparatus according to the embodiments is not limited to the arrangement

[Overview of Encryption Key Setting-Up Approach According to Embodiments]

The information processing apparatus 900 acquires an encryption key safely from an external apparatus via contact/non-contact communication and safely sets up the acquired encryption key, by executing the processes as described in (1) and (2) below under the premises as described in (0) below. In this context, the safe acquisition of the encryption key according to the embodiments is an acquisition of the encryption key from the external apparatus by the information processing apparatus 900, with leakage of the encryption key avoided, for example. In addition, in this context, the safe set-up of the encryption key according to the embodiments means to store the acquired encryption key into a predefined memory area in the internal memory (storage) by the information processing apparatus 900, with leakage of the encryption key avoided, for example. With the encryption key stored in the predefined memory area, the information processing apparatus 900 may encrypt the communication via the communication path compatible with the stored encryption key. In other words, setting-up the encryption key according to the embodiments is activating the encryption key for the communication.

The external apparatus according to the embodiments may be an administrative server for managing the issuance processes, for example. For example, the information processing apparatus 900 acquires the encryption key from the administrative server by contact/non-contact communication with the administrative server directly or via a network or the like. However, the way of acquiring the encryption key by the information processing apparatus 900 is not limited to the way as described above. For example, the information processing apparatus 900 may acquire the encryption key from the administrative server through a reader/writer that can communicate with the administrative server, by non-contact communication between the information processing apparatus 900 and the reader/writer via a magnetic field to which a particular frequency, such as 13.56 MHz, is given (carrier).

Now, with reference to FIG. 1 to FIG. 3, the overview of the encryption key setting-up approach according to the embodiments will be described below. Each of the FIG. 1 to FIG. 3 is an illustration for illustrating the overview of the encryption key setting-up approach according to the embodiments of the present invention, where FIG. 1 to FIG. 3 show part of the arrangement of the information processing apparatus 900, namely, an IC chip 102 included in the information processing apparatus 900. The IC chip 102 has an internal memory (storage) 114.

(0) Premises

FIG. 1 depicts a premised situation of the internal memory 114 included in the information processing apparatus 900. In FIG. 1, the information processing apparatus 900 includes first and second data areas A1 and A2 and a shared area A3 in the internal memory 114. The first data area A1 is a memory area for the first OS. The first data area A1 is a memory area for the first OS. The first OS may write/read data into/from the first data area A1. The second data area A2 is a memory area for the second OS. The second OS may write/read data into/from the first data area A2. The shared area A3 is a memory area shared by the first and second OSs. Both of the first and second OSs may write/read data into/from the shared area A3.

In the first area A1, an encryption key K1 (which will be referred to as the "first encryption key K1" hereinafter) is stored for use in the encrypted communication under the first communication protocol. Accordingly, the information processing apparatus 900 may communicate with the external apparatus safely via the first communication path by encrypting the communication via the first communication path by use of the first encryption key K1.

For example, the information processing apparatus 900 may store, in the first data area A1, an encryption key (different from the first encryption key K1) for the first mutual authentication between the information processing apparatus 900 and the external apparatus, such as the administrative server 300, which will be described later. Besides, it should be appreciated that the first encryption key K1 may be used for the encryption key for the above-mentioned mutual authentication. In the explanation below, the first encryption key K1 will be used for the encryption key for the above-mentioned mutual authentication.

In the explanatory example given below, the information processing apparatus 900 sets up another encryption key K2 (which will be referred to as the "second encryption key K2" hereinafter) acquired from the external apparatus for use in another encrypted communication (which will be referred to as the "second encrypted communication" hereinafter) under the second communication protocol. In the example below, the first and second OS will handle the processes. The first and second OSs according to the embodiments are run by an operating-system running unit of the information processing apparatus 900. In the example below, the second encryption key K2 is used for the second mutual authentication between the information processing apparatus 900 and the external apparatus, such as the administrative server 300, which will be described later.

(1) Process of Acquiring Second Encryption Key

The first OS acquires the second encryption key K2 from the external apparatus via the first communication path encrypted with the first encryption key K1. Then, the first OS stores the acquired second encryption key K2 in the shared area A3 (FIG. 2). Thus, the first OS can acquire the second encryption key K2 safely, because the first OS can acquire the second encryption key K2 from the external apparatus via the first communication path encrypted with the first encryption key K1.

(2) Process of Setting up Second Encryption Key

The second OS transfers the second encryption key K2 stored in the shared area A3 from the shared area A3 to the second data area A2 (Set-up of the second encryption key). At this point, the second OS implements the transfer of the second encryption key K2 by reading out the second encryption key K2 from the shared area A3, writing it into the second data area A2, and then removing the second encryption key K2 from the shared area A3. In addition, the second OS may set the second encryption key K2 by checking the shared area A3 regularly/irregularly to confirm whether the second encryption key K2 is stored therein; however, the timing is not limited thereto.

As described above, for example, the set-up of the second encryption key K2 is handled by the second OS independently of the process by the first OS (e.g., the process of (1)). Moreover, the second OS sets the second encryption key K2 by transferring the second encryption key K2 to the second data area, from/into which nothing but the second OS is allowed reading/writing. Thus, the second OS can set up the second encryption key K2 safely in the second data area A2.

Besides, for setting the second encryption key K2, the information processing apparatus according to the embodiments may store the second encryption key into the shared area A3. In this case, the second OS implements the second encrypted communication with the external apparatus by read out the second encryption key K2 from the shared area A3 at any appropriate occasions.

For example, the information processing apparatus 900 may execute the processes as described in (1) and (2) under the premises as described in (0). Thus, the information processing apparatus 900 can acquire the second encryption key K2 safely from the external apparatus, and set up the acquired second encryption key K2 safely. Consequently, the information processing apparatus 900 can set up the encryption keys safely via contact/non-contact communication with the external apparatus, such as an administrative server for managing issuance processes.

Moreover, the information processing apparatus 900 may encrypt the second communication path by use of the set-up encryption key K2, and communicate with the external apparatus, such as the administrative server, via the second communication path encrypted with the second encryption key K2. Accordingly, the information processing apparatus 900 may safely execute new issuance processes on the second data area for the second OS, because it can have contact/non-communication with the administrative server for managing the issuance processes via the encrypted second communication path. The issuance processes will starts with the second OS sending an issuance process request for the start of the issuance processes via the second encrypted communication; however, the timing of the start of the issuance processes is not limited thereto. When the issuance process request is sent, the second data area A2 included in the information processing apparatus 900 will be initialised to be available for services by communication between the information processing apparatus 900 and the external apparatus, such as the administrative server, for example.

In the information processing system 9000, the issuance processes may be executed when the information processing apparatus 900 and the external apparatus successfully authenticate each other mutually by use of the set-up encryption keys, for example. In other words, in the information processing system 9000, the issuance processes will not executed if the encryption key set up for the information processing apparatus 900 is an unauthorised encryption key. Thus, the information processing system 9000 can protect itself against cracking by a malicious third party more surely than the related art.

Furthermore, if the key length of the first encryption key K1 is longer than the key length of the second encryption key K2, the information processing apparatus 900 may set up the second encryption key K2 via the first encrypted communication, which is more robust cryptographically. Thus, the information processing apparatus 900 can more securely set up another encryption key for another encrypted communication via one encrypted communication with an encryption key of a longer key length. As for a practical example of this, an MIFARE® encryption key whose key length is 6 bytes may be set up via FeliCa® communication (the first communication) with an encryption key whose key length is 8 bytes; the key lengths are not limited thereto.

Now, an information processing system according to the embodiments will be described below, which system may implement the above-described encryption key setting-up approach according to the embodiments. Three exemplary information processing systems according to the embodiments will be given below: an information processing system 1000 according to the first embodiment; an information processing system 2000 according to the second embodiment;

and an information processing system 3000 according to the third embodiment. The information processing system 1000 according to the first embodiment is an information processing system in which the information processing apparatus 900 and the administrative server (external apparatus) for managing the issuance processes communicates with each other via a network (or directly). The information processing system 2000 according to the second embodiment is the first example information processing system in which the information processing apparatus 900 and the administrative server communicates with each other via a reader/writer. The information processing system 3000 according to the third embodiment is the second example information processing system in which the information processing apparatus 900 and the administrative server may communicate with each other via a reader/writer.

(Information Processing System According to First Embodiment)

Figure 4:
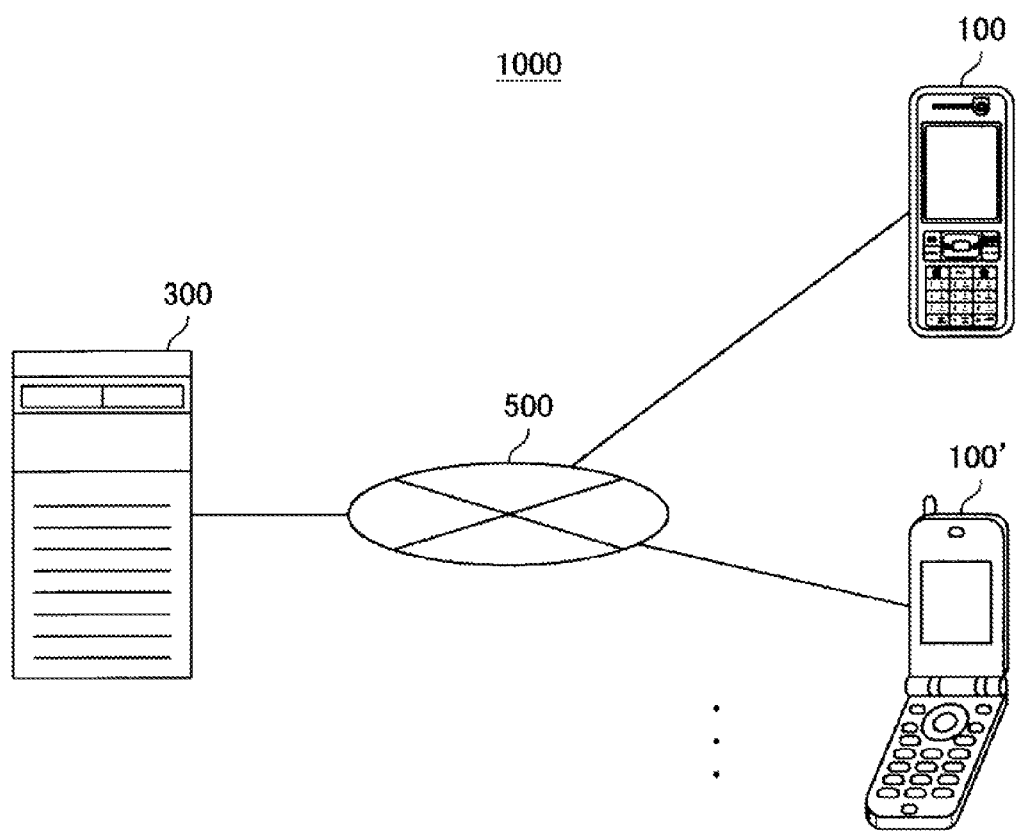
FIG. 4 is an illustration that shows an exemplary arrangement of an information processing system according to the first embodiment.

FIG. 4 is an illustration that shows an exemplary arrangement of the information processing system 1000 according to the first embodiment.

The information processing system 1000 includes information processing apparatuses 100, 100', ..., and an administrative server 300, where each of the information processing apparatuses and the administrative server 300 are connected to each other via a network 500. Then, a first and second encryption keys are stored in the administrative server 300: the first one for use in a first encrypted communication; and the second one for use in a second encrypted communication. The administrative server 300 may cause each of the information processing apparatuses to execute the issuance processes. In other words, the administrative server 300 takes a role for managing the issuance processes. For example, the network 500 may be a wired network, such as a LAN (Local Area Network), a WAN (Wide Area Network), etc., or a wireless network, such as a WWAN (Wireless Wide Area Network), an MWAN (Wireless Metropolitan Area Network), etc. via a base station, or otherwise the Internet using a communication protocol, such as the TCP/IP (Transmission Control Protocol/Internet Protocol); though, it is not limited thereto.

In FIG. 4, the information processing apparatuses 100 and 100' are depicted as mobile phones; though, it should be appreciated that the information processing apparatuses according to the embodiments of the present invention are no limited to mobile phones.

[Overview of Process in Information Processing System 1000 According to First Embodiment]

Before the arrangements of the information processing apparatuses 100, 100', ..., and the administrative server 300, there will be described an overview of the processes related to setting-up of encryption keys in the information processing system 1000. In the explanation below, for example, the information processing apparatus 100 and the administrative server 300 will execute the processes. The processes by the other information processing apparatuses according to the embodiments of the present invention and the administrative server 300 will not be described in detail here, since these processes are similar to the processes by the information processing apparatus 100 and the administrative server 300.

Figure 5A:
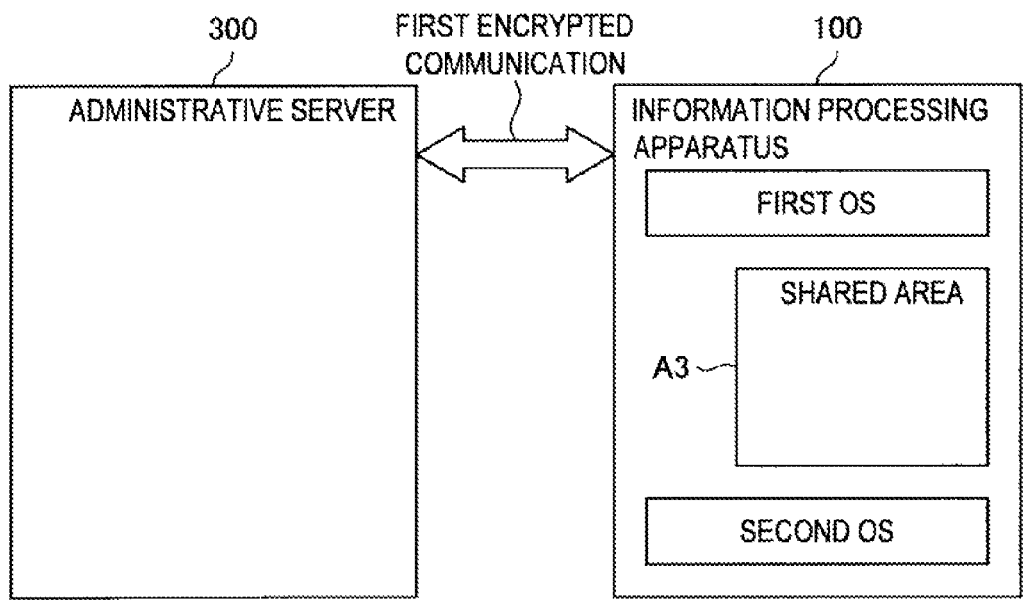
FIG. 5A is an illustration for illustrating the overview of the processes related to setting-up of the encryption keys in the information processing system according to the first embodiment.
Figure 5B:
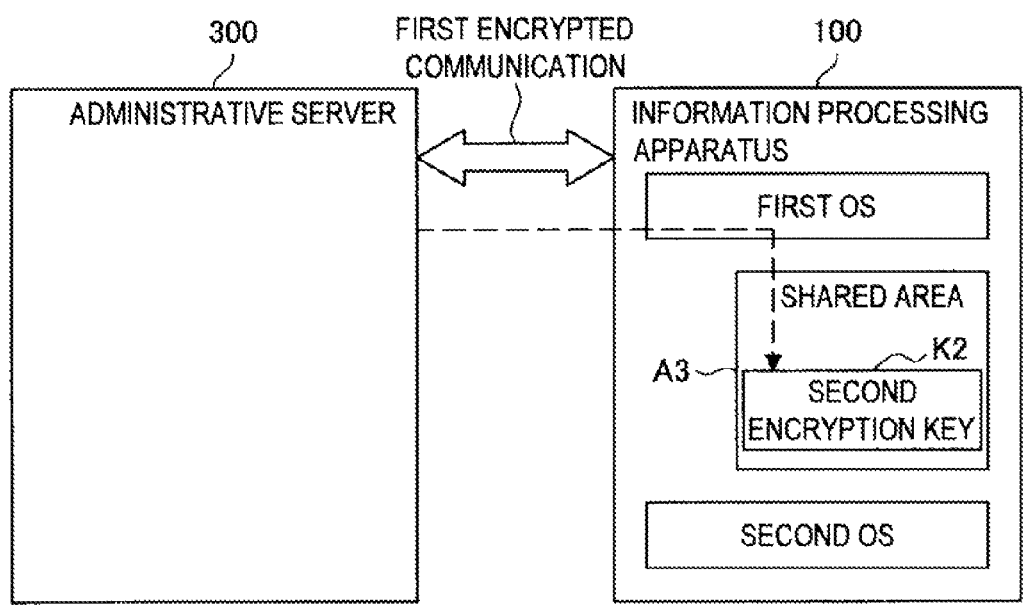
FIG. 5B is an illustration for illustrating the overview of the processes related to setting-up of the encryption keys in the information processing system according to the first embodiment.
Figure 5C:
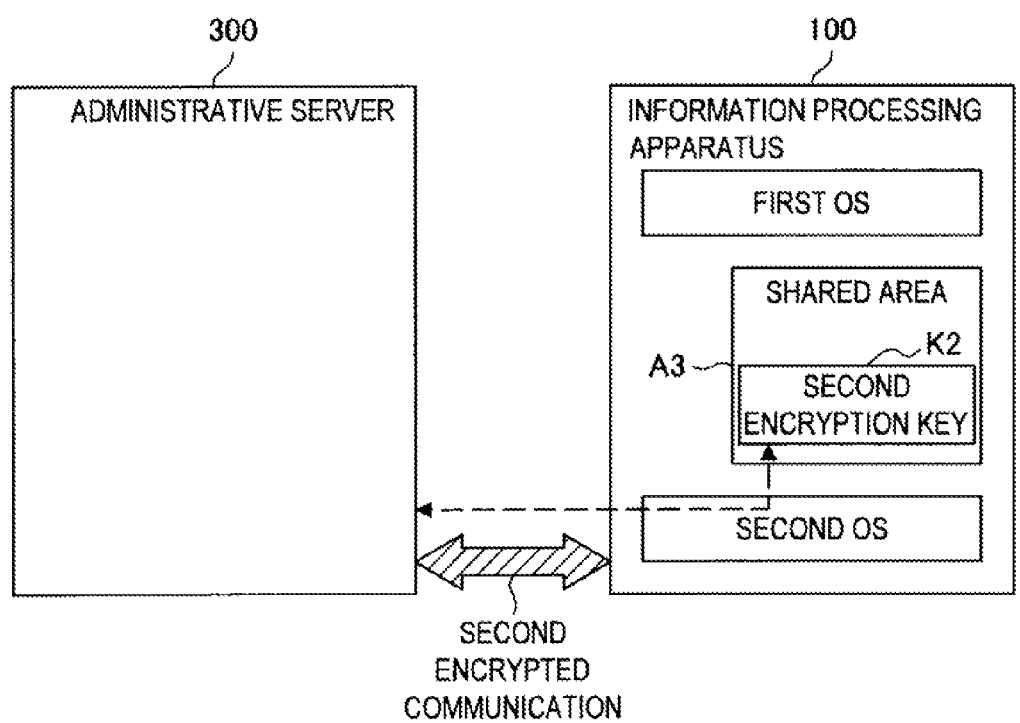
FIG. 5C is an illustration for illustrating the overview of the processes related to setting-up of the encryption keys in the information processing system according to the first embodiment.

FIG. 5A to FIG. 5C are illustrations for illustrating the overview of the processes related to setting-up of the encryption keys in the information processing system 1000 according to the first embodiment. FIG. 5A to FIG. 5C show the processes in the chronological order of: FIG. 5A-FIG. 5B-FIG. 5C.

[1-1] First Process (FIG. 5A)

The first OS of the information processing apparatus 100 communicates with the administrative server 300 via a first communication path encrypted with a first encryption key K1.

[1-2] Second Process (FIG. 5B)

The first OS acquires a second encryption key K2 from the administrative server 300 via the communication over the encrypted first communication path, and store the acquired second encryption key K2 into a shared area A3.

[1-3] Third Process (FIG. 5C)

The second OS transfers the second encryption key K2 stored in the shared area A3 to a second data area, and communicates with the administrative server 300 via a second communication path encrypted with the second encryption key K2 transferred to the second data area. Besides, the second data area is not shown in FIG. 5C for simplicity.

In the information processing system 1000, the processes shown in FIG. 5A to FIG. 5C may be executed between the information processing apparatus 100 and the administrative server 300, for example. By the processes shown in FIG. 5A to FIG. 5C, the information processing apparatus 100 can acquire the second encryption key K2 safely from the administrative server 300. Moreover, by the processes shown in FIG. 5A to FIG. 5C, the information processing apparatus 100 can set up the acquired second encryption key K2 safely, and communicate with the administrative server 300 via the second encrypted communication by use of the set-up second encryption key K2. Thus, the information processing system 1000 may implement the above-described encryption key setting-up approach according to the embodiments.

[Exemplary Arrangement of Information Processing System 1000]

Next, there will be described the arrangement of the information processing system 1000 that can implement the processes shown in FIG. 5A to FIG. 5C. The information processing apparatus 100 will be described below, representing the information processing apparatuses included in the information processing system 1000. The other information processing apparatuses according to the embodiments will not be described in detail here since they may be arranged similarly to the information processing apparatus 100.

[Information Processing Apparatus 100]

FIG. 6 is an illustration that shows an example of the arrangement of the information processing apparatus 100 according to the first embodiment. The information processing apparatus 100 includes an IC chip 102, a communication unit 104, a control unit 106, a handling unit 108, and a display unit 110.

The information processing apparatus 100 may include a ROM (Read Only Memory: not shown), a RAM (Random Access Memory: not shown), and information storage (not shown), for example. The information processing apparatus 100 may connect the components to each other via a bus as a transmission path for data. The ROM is provided for storing data for control, such as programs, operating parameters, etc. to be used by the control unit 106. The RAM is provided for temporarily storing programs to be executed by the control unit 106, for example. The information storage (not shown) is means for storing included in the information processing apparatus 100; various data may be stored therein, such as applications, for example. The information storage (not shown) may be a magnetic storage medium, such as a Hard Disk, or a non-volatile memory, such as a flash memory, for example. However, it is not limited thereto.

[Example of Hardware Arrangement for Information Processing Apparatus 100]

Figure 7:
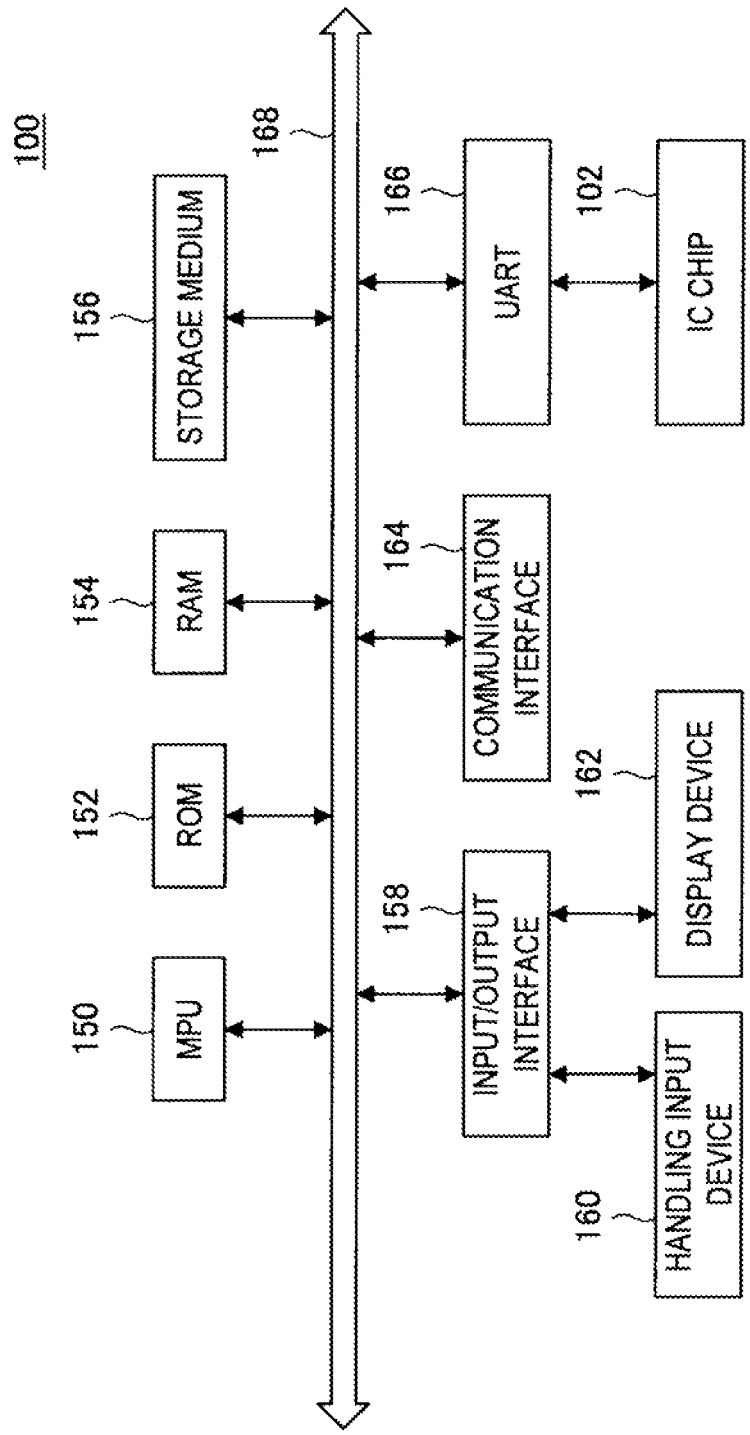
FIG. 7 is an illustration that shows an example of the hardware arrangement for the information processing apparatus according to the embodiments.

FIG. 7 is an illustration that shows an example of the hardware arrangement for the information processing apparatus 100 according to the embodiments of the present invention. In FIG. 7, for example, the information processing apparatus 100 includes an MPU 150, a ROM 152, a RAM 154, a storage medium 156, an input/output interface 158, a handling input device 160, a display device 162, a communication interface 164, a UART (Universal Asynchronous Receiver/Transmitter) 166, and an IC chip 102. Then, the information processing apparatus 100 connects its components to each other via a bus 168 as a transmission path for data, for example.

The MPU 150 includes an MPU (Micro Processing Unit), an integrated circuit with multiple circuits integrated for implementing control functions, etc. And it functions as the control unit 106 for controlling the entire information processing apparatus 100. Additionally, in the information processing apparatus 100, the MPU 150 may take roles of a communication control unit 120 and an internal memory managing unit 122, which are to be described later.

The ROM 152 is provided for storing data for control, such as programs, operation parameters, etc. to be used by the MPU 150. The RAM 154 is provided for temporarily storing programs to be executed by the MPU 150, for example.

The storage medium 156 functions as the information storage (not shown), and various data may be stored therein, such as applications. The storage medium 156 may be a magnetic storage medium, such as a Hard Disk, or a non-volatile memory, such as a flash memory, for example, though it is not limited thereto.

The input/output interface 158 connects, for example, the handling input device 160 and/or the display device 162 to the information processing apparatus 100. The handling input device 160 functions as the handling unit 108. The display device 162 functions as the display unit 110. The input/output interface 158 may be a USB (Universal Serial Bus) terminal, a DVI (Digital Visual Interface) terminal, an HDMI (High-Definition Multimedia Interface) terminal, for example, though it is not limited thereto. For example, the handling input device 160 may be mounted on the information processing apparatus 100 to be connected to the input/output interface 158 through the inside of the information processing apparatus 100. For example, the handling input device 160 may be buttons, directional keys, rotary selectors, such as Jog-dials, or any combinations thereof, though it is not limited thereto. And the display device 162 may be mounted on the information processing apparatus 100 to be connected to the input/output interface 158 through the inside of the information processing apparatus 100. For example, the display device 162 may be an LCD (Liquid Crystal Display) or an organic EL (Electro-Luminescence) display (or an OLED (Organic Light Emitting Diode) display), though it is not limited thereto. Besides, it should be appreciated that the input/output interface 158 may be connectable to handling input devices (e.g., keyboards, mice, etc.) and/or display devices (e.g., external display, etc.) which are external apparatuses for the information processing apparatus 100.

The communication interface 164 is a communication means included in the information processing apparatus 100, and functions as the communication unit 104 for wired/wireless communication between the information processing apparatus 100 and the external apparatuses, such as the administrative server 300. For example, the communication interface 164 may be a set of a communication antenna and an RF circuit (for wireless communication), a set of an IEEE 802.15.1 port and a transmitting/receiving circuit (for wireless communication), a set of an IEEE 802.11b port and a transmitting/receiving circuit (for wireless communication), or a set of a LAN terminal and a transmitting/receiving circuit (for wired communication), though it is not limited thereto. The communication interface 164 may be configured to comply with the network 500.

The UART 166 takes a role of an interface for connecting the IC chip 102 to the bus 168.

The IC chip 102 is an integrated circuit for implementing various functions related to communication between the information processing apparatus 100 and a reader/writer via a carrier. The IC chip 102 runs multiple OSs, such as the first OS and the second OS to handle various processes, such as processing related to control over IC chip 102, data processing, etc. For example, the processes handled by the IC chip 102 may be data processing in response to instructions from the outside of the IC chip 102, such as various instructions from the reader/writer, instructions from components of the information processing apparatus 100 other than the IC chip 102 (e.g., the control unit 106), etc. The IC chip 102 includes the internal memory 114 that has a first data area A1, a second data area A2, and a shared area A3 as shown in FIG. 1 and the others. The safety for storing encryption keys, such as the first encryption key K1, into the IC chip 102 will be provided at least by the tamper-resistant internal memory 114, for example.

Arranged as shown in FIG. 7, for example, the information processing apparatus 100 implements the processes related to the above-described encryption key setting-up approach as shown in FIG. 5A to FIG. 5C. Besides, it should be appreciated that the hardware arrangement for the information processing apparatus 100 according to the embodiments is not limited to the arrangement shown in FIG. 7. For example, the information processing apparatus according to the first embodiment may further include an encrypting circuit (not shown) for encrypting each of the communication path by use of the first encryption key K1 or the second encryption key K2. Yet, for example, each of the circuits that are included in the IC chip 102 in the above examples may be included separately in the information processing apparatus according to the first embodiment, not integrated in an IC chip.

With reference to FIG. 6 again, the components of the information processing apparatus 100 will be described. The IC chip 102 is an integrated circuit for implementing various functions related to communication between the information processing apparatus 100 and a reader/writer via a carrier. It may be tamper-resistant. The IC chip 102 includes an in-chip communication unit 112, an internal memory (storage) 114, and an internal control unit 116.

A carrier signal sent from the reader/writer via the carrier is received a communication antenna connected to the in-chip communication unit 112, which demodulates the carrier signal into data. The in-chip communication unit 112 then transfers the data. Moreover, by load modulation with a load modulation circuit (not shown) that includes loads and switching elements, the in-chip communication unit 112 sends a response signal via the communication antenna (not shown). For example, the communication antenna (not shown) may include a resonant circuit that includes a capacitor of a predetermined capacitance and a coil of a predetermine inductance for a transmitting/receiving antenna, though the arrangement of the communication antenna is not limited thereto. Arranged as described above, for example, the in-chip communication unit 112 may receive a carrier sent from the reader/writer, and send a response signal to the reader/writer.

The internal memory 114 is a storage included in the IC chip 102. It may be tamper-resistant. Various data (information) is stored in the internal memory 114, for example, operating systems, such as the first and second OSs, encryption keys for use in communication between the information processing apparatus 100 and the external apparatus, information of the IC chip identification and the like, and data for services, such as electric values (e.g., electric money) and the like. The internal memory 114 has memory areas from/into which the respective OSs may only read/write, and also has a shared area from/into which any of the OSs may read/write. FIG. 6 shows an example of the internal memory 114 that has a first data area A1, a second data area A2, and a shared area A3. In the first data area A1, the first encryption key K1 is stored. In the example shown in FIG. 6, a first OS 140 and a second OS 142 is stored in the internal memory 114. Besides, the first OS 140 and the second OS 142 may be stored in a ROM included in the IC chip 102.

The internal control unit 116 includes an MPU and various processing circuits, such as a cryptographic processing circuit, to execute various processes, such as processing related to control over the IC chip 102, data processing, etc.

Moreover, the internal control unit 116 runs the first OS 140 and the second OS 142 stored in the internal memory 114. In the information apparatus 100, the internal control unit 116 thus takes a role of the operating-system running unit for running the first OS 140 and the second OS 142. Then, the first OS 140 and the second OS 142 run by the internal control unit 116 handles the processes related to the encryption key setting-up approach as shown in FIG. 5A to FIG. 5C, for example.

More specifically, by sending an instruction to the control unit 106, the first OS 140 instructs the control unit 106 to acquire the second encryption key K2 from the administrative server 300 via the first encrypted communication between the information processing apparatus 100 and the administrative server 300 through the communication unit 104. The control unit 106 transfers the second encryption key K2 to the first OS, by which the second encryption key is stored into the shared area A3. The second OS 142 refers to the shared area A3 regularly/irregularly, and transfers the second encryption key K2 from the shared area A3 to the second data area A2 if the second encryption key K2 is stored in the shared area A3. In addition, the second OS may not refer to the shared area A3 if the second encryption key K2 has been already stored in the second data area A2.

By the internal control unit 116 running the first OS 140 and the second OS 142, the information processing apparatus 100 may execute the processes related to the encryption key setting-up approach as shown in FIG. 5A to FIG. 5C.

Besides, the way of executing the processes related to the encryption key setting-up approach according to the first embodiment of the present invention is not limited to the above-described ways. For example, the control unit 106 may read the first OS 140 and the second OS 142 out from the internal memory 114, and run them, so that the information processing apparatus 100 executes the processes related to the encryption key setting-up approach as shown in FIG. 5A to FIG. 5C. In this case, the control unit 106 takes a role of the operating-system running unit.

Moreover, the internal control 116 executes processes based on various instructions and data contained in the carrier signal demodulated by the in-chip communication unit 112. Then, upon the result of the processes, the internal control unit 116 generates a modulation control signal for control over load modulation by the load modulation circuit (not shown), and sends it to the load modulation circuit (not shown). At this point, the internal control unit 116 may encrypt the response signal to send to the reader/writer by use of the first encryption key K1 or the second encryption key K2 stored in the internal memory 114 in correspondence with the communication path through which the response signal is to be sent.

Arranged as described above, for example, the IC chip 102 gets in communication with the reader/writer via the carrier, and executes various processes related to this communication. And also, arranged as described above, the IC chip 102 runs the first OS 140 and the second OS 142 to implement the processes related to the encryption key setting-up approach according to the embodiments. Besides, the arrangement of an IC chip included in the information process apparatus according to the first embodiment is not limited to that of the IC chip 102 shown in FIG. 6.

The communication unit 104 is means for communication included in the information processing apparatus 100. It gets in wired/wireless communication with the external apparatuses, such as the administrative server 300, via the network 500 (or directly). The communication between the communication unit 104 and the external apparatuses may be controlled by the control unit 106, for example.

For example, the control unit 106 includes an MPU and an integrated circuit in which various circuits are integrated, such as a cryptographic processing circuit, to take a role of controlling the entire information processing apparatus 100. In addition, the control unit 106 also includes a communication control unit 120 and an internal memory managing unit 122.

The communication control unit 120 controls the communication between the information processing apparatus 100 and the external apparatuses, such as the administrative server 300, through the communication unit 104. Moreover, the communication control unit 120 communicates with the external apparatuses, such as the administrative server 300, based on various instructions sent from the IC chip 102. At this point, the communication control unit 120 may encrypt the communication path through which it communicates with the external apparatus by use of an encryption key read out from the internal memory 114 by the internal memory managing unit 122.

The internal memory managing unit 122 takes a role of managing the internal memory 114 from the outside of the IC chip 102. More specifically, the internal memory managing unit 122 lets data be read from/written into the internal memory 114. Furthermore, in cooperation with each running OS, for example, the internal memory managing unit 122 may read/write data from/into the first data area A1, the second data area A2, and the shared area A3 in the internal memory 114.

The processes related to the encryption key setting-up approach according to the embodiments of the present invention may be implemented by the control unit 106 including the communication control unit 120 and the internal memory managing unit 122 to execute processes in cooperation with each running OS, for example. Besides, for example, the control unit 106 may also take a role of the operating-system running unit for reading the first OS 140 and the second OS 142 out from the internal memory 114 and running them.

The handling unit 108 is included in the information processing apparatus 100 as means for a user to handle the information processing apparatus 100. With the handling unit 108 included therein, the information processing apparatus 100 can execute a process desired by a user. For example, the handling unit 108 may be buttons, directional keys, rotary selectors, such as Jog-dials, or any combinations thereof, though it is not limited thereto.

The display unit 110 is included in the information processing apparatus 100 as means for displaying various pieces of information on its display screen. A picture displayed on the display screen of the display unit 110 could be a screen for controlling the information processing apparatus 100 to operate as desired. For example, the display unit 110 may be an LCD or an organic EL display, though it is not limited thereto.

Arranged as shown in FIG. 6, for example, the information processing apparatus implements the processes related to the encryption key setting-up approach as shown in FIG. 5A to FIG. 5C. Consequently, the information processing apparatus 100 can set up encryption keys safely via contact/non-contact communication with the administrative server 300. Furthermore, the information processing apparatus 100 can execute the issuance processes safely via encrypted communication with the administrative server 300 by use of the set-up encryption keys.

[Administrative Server 300]

Figure 8:
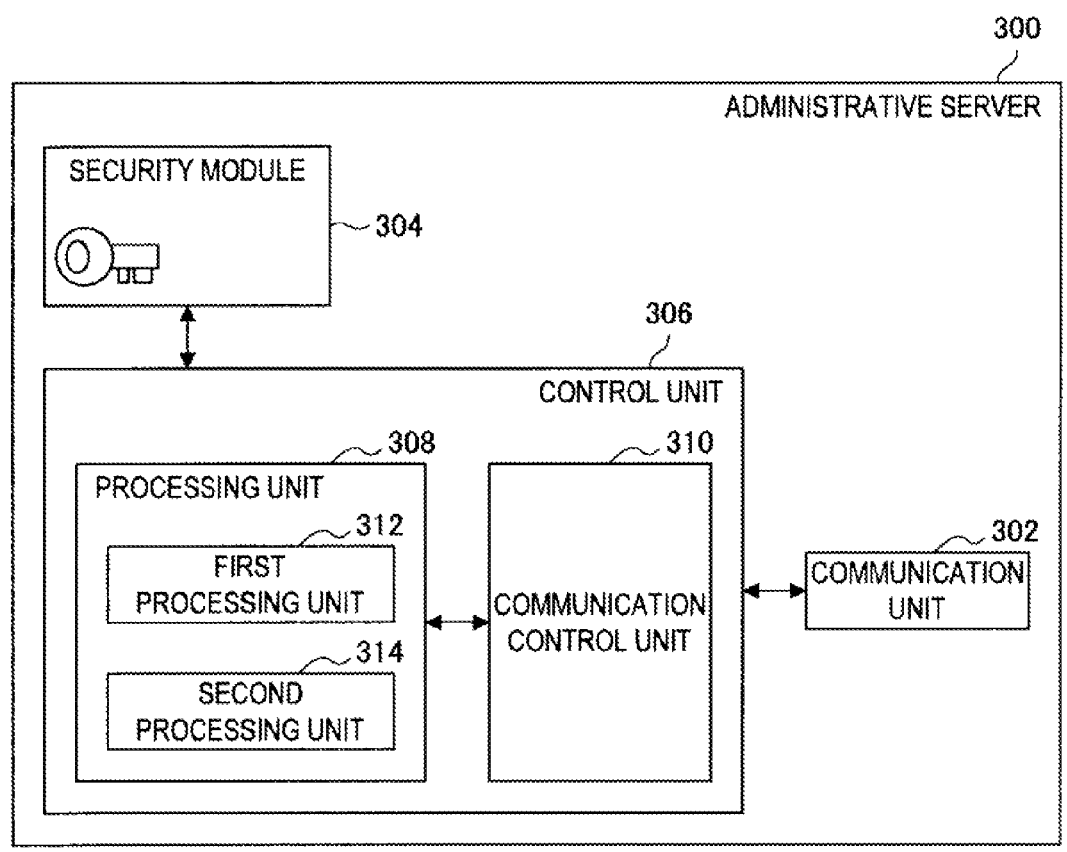
FIG. 8 is an illustration that shows an exemplary arrangement of an administrative server according to the first embodiment.

Next, there will be described the arrangement of the administrative server 300 according to the first embodiment. FIG. 8 is an illustration that shows an exemplary arrangement of the administrative server 300 according to the first embodiment.

The administrative server 300 includes a communication unit 302 (administrative communication unit), a security module 304 (administrative storage), and a control unit 306.

The administrative server 300 may also include a ROM (not shown), a RAM (not shown), an information storage (not shown), a handling unit (not shown) for user handling, a display unit (not shown), etc. For example, the administrative server 300 may connect its components to each other via a bus as a transmission path for data.

The ROM (not shown) is provided for storing data for control, such as programs, operating parameters, etc. to be used by the control unit 306. The RAM (not shown) is provided for temporarily storing programs to be executed by the control unit 306, for example. The information storage (not shown) is means for storing included in the administrative server 300, and various data may be stored therein, such as data for use in the issuance processes, various databases, applications, etc. The information storage (not shown) may be a magnetic storage medium, such as a Hard Disk, or a non-volatile memory, such as a flash memory, for example. However, it is not limited thereto.

The handling unit (not shown) is included in the administrative server 300 as means for enabling a user to handle the administrative server 300. With the handling unit (not shown) included therein, the administrative server 300 can execute a process desired by a user of the administrative server (e.g., an administrator). For example, the handling unit (not shown) may be a handling input device, such as a keyboard, a mouse, etc., or buttons, directional keys, rotary selectors, such as Jog-dials, or any combinations thereof, though it is not limited thereto.

The display unit (not shown) is included in the information processing apparatus 100 as means for displaying various pieces of information on its display screen. A picture displayed on the display screen of the display unit (not shown) could be a screen for controlling the administrative server 300 to operate as desired. For example, the display unit (not shown) may be an LCD or an organic EL display, though it is not limited thereto.

<Example of Hardware Arrangement for Administrative Server 300>

Figure 9:
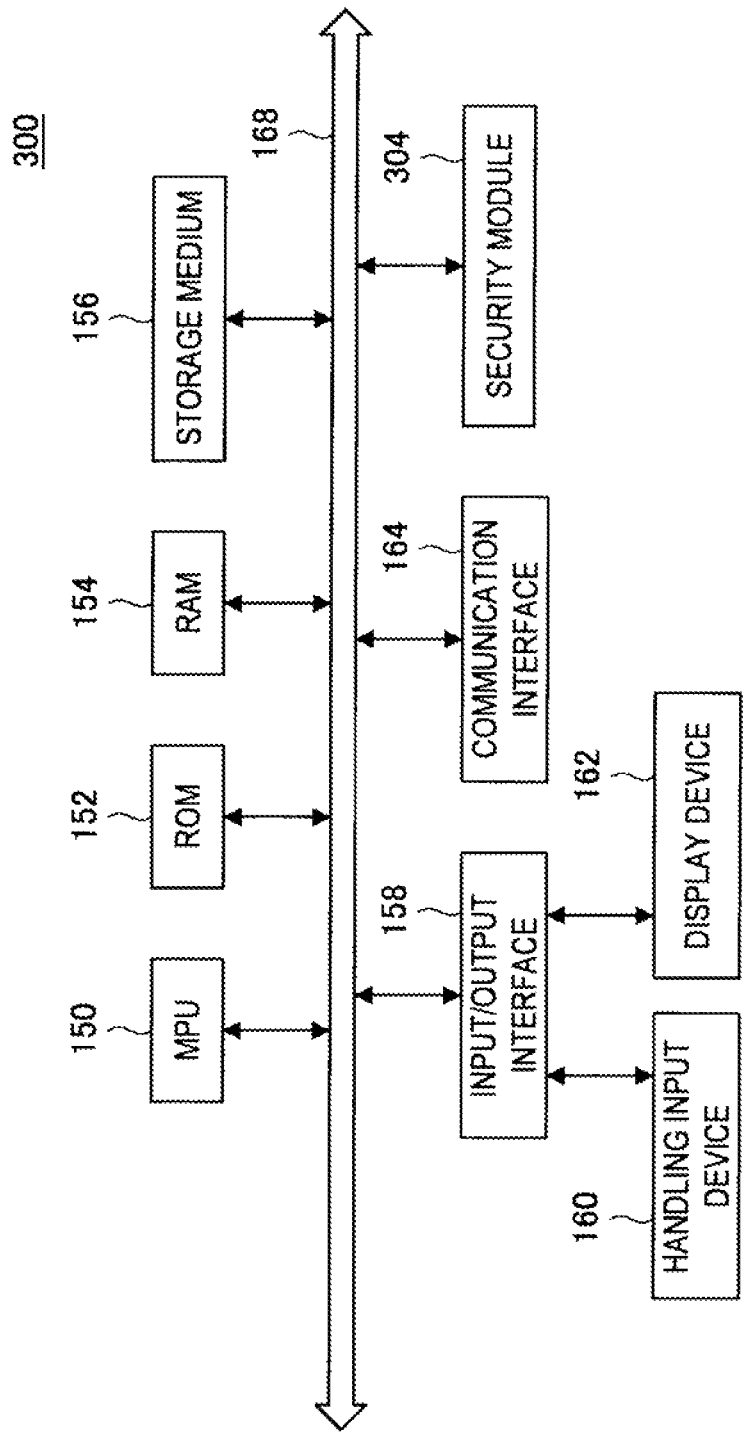
FIG. 9 is an illustration that shows an example of the hardware arrangement for the administrative server according to the first embodiment.

FIG. 9 is an illustration that shows an example of the hardware arrangement for the administrative server 300 according to the first embodiment. In FIG. 9, for example, the administrative server 300 includes an MPU 150, a ROM 152, a RAM 154, a storage medium 156, an input/output interface 158, a handling input device 160, a display device 162, a communication interface 164, and a security module 304. Then, the administrative server 300 connects its components to each other via a bus 168 as a transmission path for data, for example.

The MPU 150 includes an MPU, an integrated circuit with multiple circuits integrated for implementing control functions, etc. And it functions as the control unit 306 for controlling the entire administrative server 300. Additionally, in the administrative server 300, the MPU 150 may take roles of a processing unit 308 and a communication control unit 310, which are to be described later.

The ROM 152 is provided for storing data for control, such as programs, operation parameters, etc. to be used by the MPU 150. The RAM 154 is provided for temporarily storing programs to be executed by the MPU 150, for example.

The storage medium 156 functions as an information storage (not shown), and various data may be stored therein, such as data for use in the issuance processes, various database, applications, etc.

The input/output interface 158 connects, for example, the handling input device 160 and/or the display device 162 to the administrative server 300. The handling input device 160 functions as the handling unit (not shown). The display device 162 functions as the display unit (not shown).

The communication interface 164 is a communication means included in the administrative server 300, and functions as the communication unit 302 for wired/wireless communication between the administrative server 300 and the external apparatuses, such as the information processing apparatuses 100, 100', . . . , via the network 500 (or directly).

The security module 304 (administrative storage) is provided for storing encryption keys for encrypting the communications under the respective communication protocols, encryption keys for accessing to the internal memories of the IC chips included in the respective information processing apparatuses, etc. In other words, the first encryption key K1 for the first encrypted communication and/or the second encryption key K2 for the second encrypted communication may be stored in the security module 304, for example.

Thus, encryption keys for communication, such as the first encryption key K1 and the second encryption key K2, may be stored in the administrative server 300 arranged as shown in FIG. 9, by which an encryption key for another communication protocol can be sent to the information processing apparatuses 100, 100', . . . , via one encrypted communication. And also, arranged as shown in FIG. 9, the administrative server 300 can manage the issuance processes for the information processing apparatuses 100, 100', . . . , by use of encrypted communication. Besides, the arrangement of the administrative server according to the embodiments is not limited thereto. For example, the administrative server according to the embodiments may not include the security module therein, and may be arranged to connect to a security module provided outside the administrative server.

With reference to FIG. 8 again, the components of the administrative server 300 will be described. The communication unit 302 is communication means included in the administrative server for contact/non-contact communication between the administrative server 300 and the external apparatuses, such as the information processing apparatus 100, via the network 500 (or directly). For example, the communication unit 302 is controlled by the control unit 306 (more specifically, by the communication control unit 310) over the communication between the administrative server 300 and the external apparatuses.

For example, the control unit 306 includes an MPU and an integrated circuit in which various circuits are integrated, such as a cryptographic processing circuit, to take a role of controlling the entire information processing apparatus 100. In addition, the control unit 306 also includes a processing unit 308 and a communication control unit 310.

The processing unit 308 executes processes in correspondence to a communication protocol in use. For example, the processes executed by the processing unit 308 may be generation of various instructions and data compatible with the communication protocol, processes of data under the communication protocol, etc., though they are not limited thereto.

In FIG. 8, the processing unit 308 includes a first processing unit 312 for executing processes for the first communication protocol and a second processing unit 314 for executing processes for the second communication protocol. In other words, the first processing unit 312 takes a role of executing processes related to communication between the administrative server 300 and the information processing apparatus 100 via the first communication path, and the second processing unit 314 takes a role of executing processes related to communication between the administrative server 300 and the information processing apparatus 100 via the second communication path. Besides, the communication protocols with which the processing unit included in the administrative server according to the first embodiment are not limited to the first and second communication protocols. For example, the processing unit included in the administrative server according to the first embodiment may cope with more than two different communication protocols.

The communication control unit 310 controls the communication between the administrative server 300 and the external apparatuses, such as the information processing apparatus 100, through the communication unit 302. In addition, the communication control unit 310 communicates with the external apparatuses, such as the information processing apparatus 100, based on various instructions sent from the processing unit 308, for example. Furthermore, the communication control unit 310 may read out an encryption key for the communication protocol from the security module 304 to encrypt the communication path for the communication between the administrative server 300 and the external apparatuses.

Arranged as shown in FIG. 8, for example, the administrative server 300 can send an encryption key for another communication protocol via one encrypted communication. Thus, the administrative server 300 can implement the processes related to the encryption key setting-up approach as shown in FIG. 5A to FIG. 5C.

In addition, by the processes related to the encryption key setting-up approach according to the embodiments of the present invention, the administrative server 300 can conduct the second encrypted communication by use of the second encryption key K2 newly set up by the information processing apparatus 100, as shown in FIG. 5C. Consequently, via the second encrypted communication, the administrative server 300 can manage new issuance processes for the information processing apparatus 100 to execute safely.

[Specific Example of Processes in Information Processing System 1000 According to First Embodiment]

Next, there will be described more specifically the processes in the information processing system 1000 according to the first embodiment. FIG. 10 is an illustration that shows exemplary processes in the information processing system 1000 according to the first embodiment. The exemplary processes shown in FIG. 10 are executed between the information processing apparatus 100 and the administrative server 300. Besides, FIG. 10 shows part of the arrangements of the information processing apparatus 100 shown in FIG. 6 and the administrative server 300 shown in FIG. 8; processes executed by the rest of the components are not shown for simplicity.

The first processing unit 312 of the administrative server 300 and the first OS run by the internal control unit 116 of the information processing apparatus 100 mutually authenticate each other (S100: First Mutual Authentication Process). For example, they mutually authenticate each other at step S100 by use of the first encryption key K1 compatible with the Triple DES (Data Encryption Standards), though the type of key is not limited thereto. For example, the mutual authentication at step S100 may be conducted by use of a degenerate key provided from multiple encryption keys. When the mutual authentication has been successfully completed at step S100, the processes related to the encryption key setting-up approach will be started between them.

Upon successful completion of the first mutual authentication at step S100, the first processing unit 312 sends (S102) an instruction to write the second encryption key K2, which is included in the instruction to be set up.

The first OS receives the instruction sent from the first processing unit 312 at step S102, and stores the second encryption key K2 into the shared area A3 of the internal memory 114 (S104). Then, the first OS sends the process result of the step S104 to the first processing unit 312 (S106). If the second encryption key K2 has not successfully received, for example, the first OS may send a resend request, as the process result, for resending the second encryption key K2.

The second OS run by the internal control unit 116 of the information processing unit 100 reads the second encrypted key K2 stored in the shared area A3, and store it into the second data area A2 (S108). In the example shown in FIG. 10, the process of step S108 is executed by the second OS after the process of step S106 is executed by the first OS, though the order is not limited thereto. The process of step S108 may executed before the process of step S106 because the first and second OSs can execute their processes independently.

When the encryption key K2 is transferred to the second data area A2 at step S108, the second OS and the second processing unit 314 of the administrative server 300 mutually authenticate each other by use of the second encryption key K2 (S110: Second Mutual Authentication Process).

Then, upon successful completion of the second mutual authentication at step S110, by the second encrypted communication, the second processing unit 314 and the second OS execute processes related to the services to be provided by the administrative server 300 (S112: Service Processes). For example, the service processes executed at step S112 may be the issuance processes, though they are not limited thereto.

In the information processing system 1000 according to the first embodiment, the above-described encryption key setting-up approach as shown in FIG. 5A to FIG. 5C is implemented by the processes shown in FIG. 10, for example. Besides, it should be appreciated that the processes in the information processing system according to the first embodiment are not limited to the example shown in FIG. 10.

As described above, the information processing system 1000 according to the first embodiment includes the information processing apparatuses 100, 100', . . . , and the administrative server 300, which is capable of contact/non-contact communication with the information processing apparatuses 100, 100', . . . , respectively. The information processing apparatus 100 (and the rest of the information processing apparatuses as well; they will be represented by the information processing apparatus 100 hereinafter) executes the processes as described in (1) and (2) under the premise as described in (0). More specifically, by the first OS in the first encrypted communication with the administrative server 300, the information processing apparatus 100 acquires the second encryption key K2 for the second encrypted communication, and stores it in the shared area A3 of the internal memory 114. Accordingly, the information processing apparatus 100 can acquires the second encryption key K2 from the administrative server 300 safely because it acquires the second encryption key K2 from the administrative server 300 via the first encrypted communication. Moreover, the second OS, which can operate independently of the first OS, transfers the second encryption key K2 from the shared area A3 to the second data area A2, into which no components other than the second OS is not allowed reading/writing, so that the information processing apparatus 100 set up the second encryption key K2. Thus, the information processing apparatus 100 can set up an encryption key safely via contact/non-contact communication with the administrative server 300. Then, with the information processing apparatuses 100, 100', . . . , and the administrative server 300 included therein, the information processing system 1000 is achieved for setting up encryption keys safely via contact/non-contact communication.

Furthermore, the information processing apparatus 100 can encrypt the second communication path by use of the set-up second encryption key K2 for the second encrypted communication with the external apparatus, such as the administrative server 300. Thus, the information processing system 1000 can safely conduct new issuance processes for the second data area for the second OS, by the information processing apparatus 100 and the administrative server 300 for managing the issuance processing in the second encrypted communication with each other.

The information processing apparatus 100 has been described above as an exemplary component included in the information processing system 1000 according to the first embodiment, though the embodiments are not limited to the embodiment described above. The embodiments may be applied to various machines: for example, portable communication tools, such as a mobile phone, a PHS (Personal Handyphone System), etc.; video/audio players, such as a WALK MAN®; portable game machines, such as a PlayStation Portable®; and computers, such as a PDA (Personal Digital Assistant), a laptop PC (Personal Computer), etc.

And, the administrative server 300 has been described as a component included in the information processing system 1000 according to the first embodiment, though the embodiments are not limited to the embodiment described above. The embodiments may be applied to various machines: for example, computers, such as a PC, a server, etc.

(Program According to First Embodiment)

By a program for cause a computer to function as the information processing apparatus according to the first embodiment, encryption keys may be set up safely via contact/non-contact communication between the computer and an external apparatus.

(Information Processing System According to Second Embodiment)

As described above, the information processing system 1000 according to the first embodiment includes the information processing apparatus 100 and the administrative server 300, which communicate with each other via the network 500 (or directly). However, the arrangement of an information processing system according to the embodiments is not limited thereto. Then, there will be described next an information processing system 2000 according to the second embodiment, in which an information processing apparatus and an administrative server can communicate with each other via a reader/writer.

FIG. 11 is an illustration that shows an exemplary arrangement of the information processing system 2000 according to the second embodiment of the present invention. In FIG. 11, the information processing system 2000 includes an information processing apparatus 200, an administrative server 300, and a reader/writer 400, where the administrative server 300 and the reader/writer 400 are connected to each other via a network 500. The information processing apparatus 200 and the reader/writer 400 may be in non-contact communication with each other via transmission waves at a particular frequency, such as 13.56 MHz, for example. Besides, FIG. 11 shows the information processing apparatus 200 arranged as an IC card with an IC chip 102 as one included in the information processing apparatus 100 shown in FIG. 6, though the arrangement of the information processing apparatus 200 is not limited thereto. For example, an information processing system according to the second embodiment may be arranged to include the information processing apparatus 100 shown in FIG. 6. The administrative server 300 included in the information processing system 2000 will not be described in detail here since it may be arranged similarly to the administrative server 300 included in the information processing system 1000 according to the first embodiment.

[Overview of Processes in Information Processing System 2000 According to Second Embodiment]

Before the arrangements of the information processing apparatus 200 and the reader/writer 400 included in the information processing system 2000, there will be described an overview of the processes related to setting-up of encryption keys in the information processing system 2000.

Figure 12A:
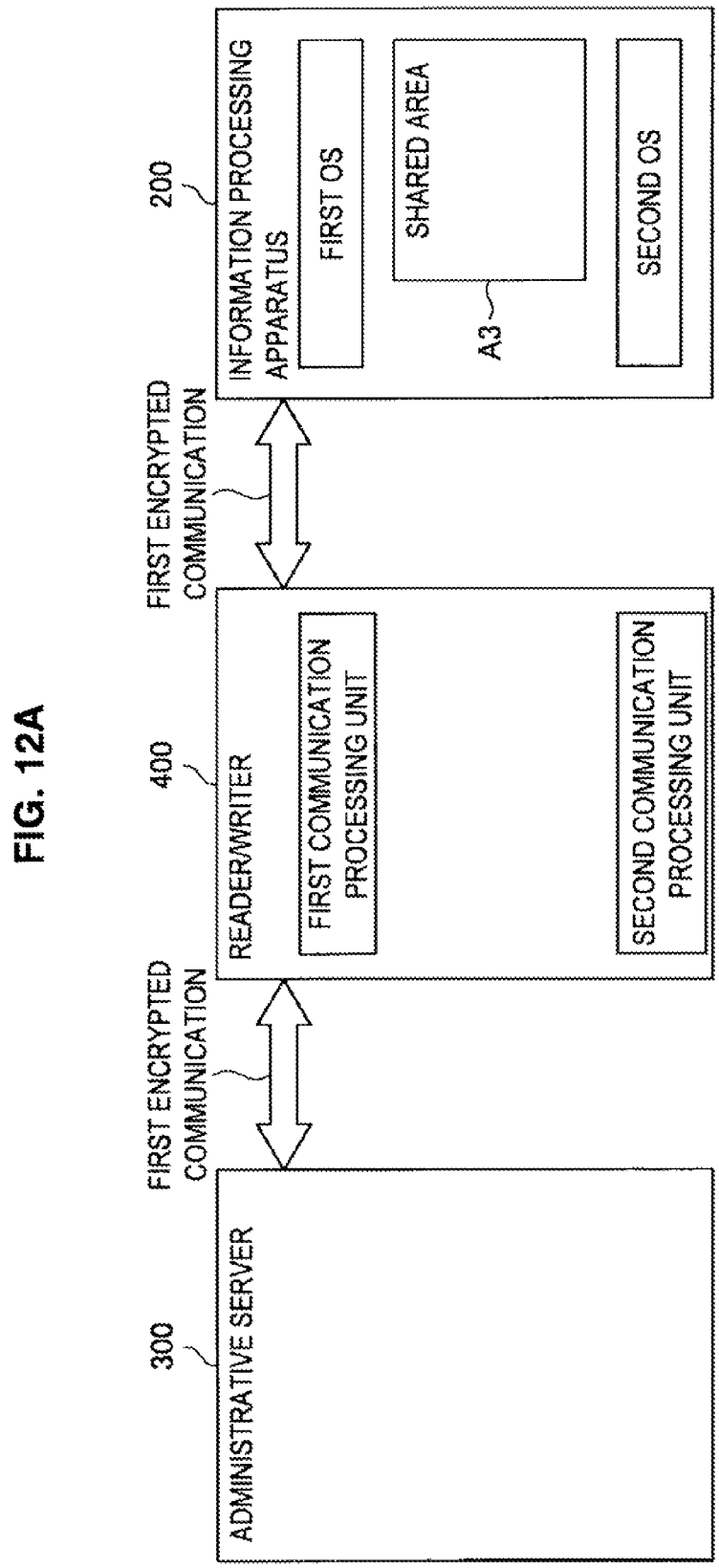
FIG. 12A is an illustration for illustrating the overview of the processes related to setting-up of the encryption keys in the information processing system according to the second embodiment.
Figure 12B:
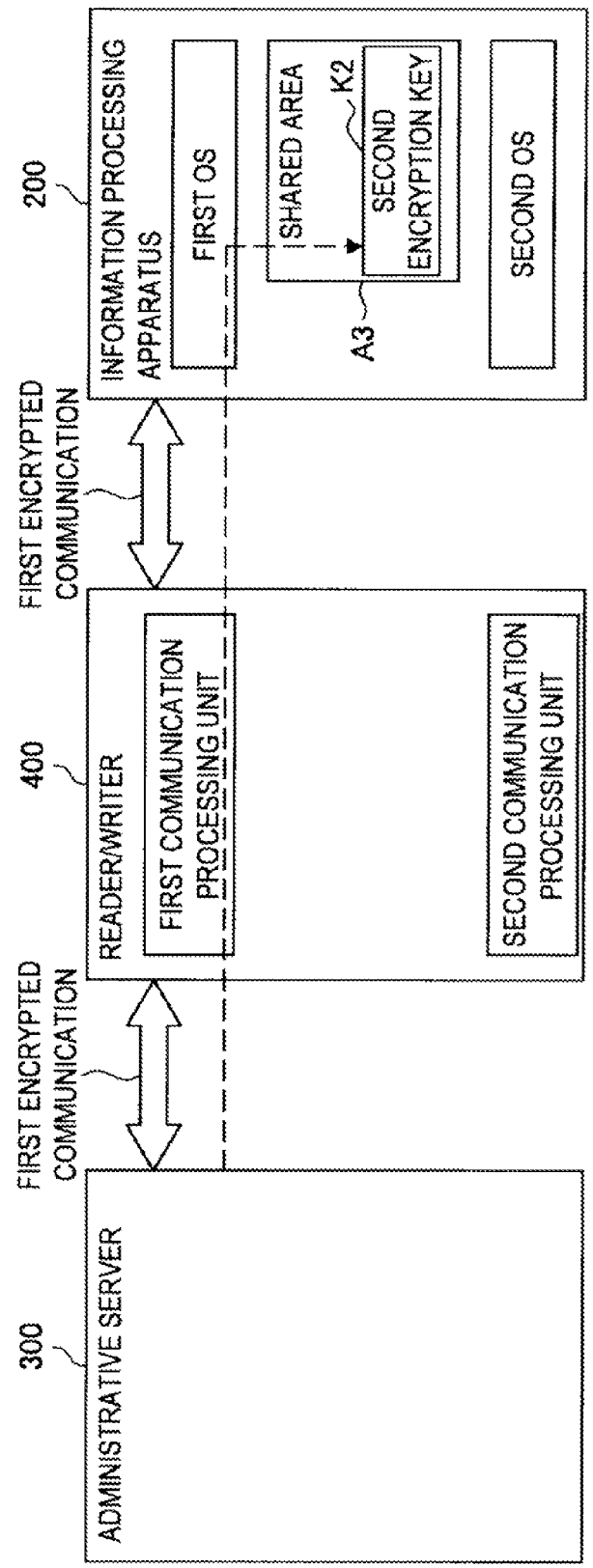
FIG. 12B is an illustration for illustrating the overview of the processes related to setting-up of the encryption keys in the information processing system according to the second embodiment.

FIG. 12A to FIG. 12C are illustrations for illustrating the overview of the processes related to setting-up of the encryption keys in the information processing system 2000 according to the second embodiment. FIG. 12A to FIG. 12C show the processes in the chronological order of: FIG. 12A-FIG. 12B-FIG. 12C.

[2-1] First Process (FIG. 12A)

The first OS of the information processing apparatus 200 communicates with the administrative server 300 via a first communication path encrypted with a first encryption key K1.

[2-2] Second Process (FIG. 12B)

The first OS acquires a second encryption key K2 from the administrative server 300 through the reader/writer 400 via the communication over the encrypted first communication path, and stores the acquired second encryption key K2 into a shared area A3.

[2-3] Third Process (FIG. 12C)

The second OS transfers the second encryption key K2 stored in the shared area A3 to a second data area, and communicates with the administrative server 300 through the reader/writer 400 via a second communication path encrypted with the second encryption key K2 transferred to the second data area. Besides, the second data area is not shown in FIG. 12C for simplicity.

In the information processing system 2000, the processes shown in FIG. 12A to FIG. 12C may be executed between the information processing apparatus 200 and the administrative server 300, for example. Now, by comparison with FIG. 5A to FIG. 5C, it can be seen in FIG. 12A to FIG. 12C that the processes in the information processing system 2000 according to the second embodiment is basically the same as the processes in the information processing system 1000 according to the first embodiment. The difference of the processes in the information processing system 2000 from those in the information processing system 1000 can be found in the way of communication, where the information processing apparatus 200 and the administrative server 300 communicates with each other through the reader/writer 400. Thus, by the processes shown in FIG. 12A to FIG. 12C, as the information processing apparatus 100 according to the first embodiment, the information processing apparatus 200 can acquire the second encryption key K2 safely from the administrative server 300. Moreover, by the processes shown in FIG. 12A to FIG. 12C, as the information processing apparatus 100, the information processing apparatus 200 can set up the acquired second encryption key K2 safely, and communicate with the administrative server 300 via the second encrypted communication by use of the set-up second encryption key K2. Thus, as the information processing system 1000 according to the first embodiment, the information processing system 2000 may implement the above-described encryption key setting-up approach according to the embodiments of the present invention.

[Exemplary Arrangement of Information Processing System 2000]

Next, there will be described the arrangement of the information processing system 2000 that can implement the processes shown in FIG. 12A to FIG. 12C. The administrative server 300 will not be described in detail here since it may be arranged similarly to the administrative server 300 according to the first embodiment.

[Information Processing Apparatus 200]

The information apparatus 200 includes an IC chip 102 arranged similarly to one included in the information processing apparatus 100 according to the first embodiment shown in FIG. 6.

With the IC chip 102 included therein, the information processing apparatus 200 may communicate with the reader/writer 400 by use of the transmission waves to execute various processes related to communications.

In addition, as the information processing apparatus 100 according to the first embodiment, with the IC chip 102 included therein, the information processing apparatus 200 runs the first OS 140 and the second OS 142 to implement the processes related to the encryption key setting-up approach according to the embodiments of the present invention. More specifically, in the information processing apparatus 200, the first OS communicate with the reader/writer 400 via the first encrypted communication by use of the in-chip communication unit 112 (communication unit) included in the IC chip 102, and the first OS stores into the shared area A3 the second encryption key K2, which is acquired via the reader/writer 400. Then, the information processing apparatus 200 set up the second encryption key K2 by the second OS transferring the first encryption key K2 from the shared area A3 to the second data area A2.

Thus, the information processing apparatus 200 can set up encryption keys safely via indirect communication with the administrative server 300 through the reader/writer 400. Moreover, in encrypted indirect communication with the administrative server 300 by use of the set-up encryption keys, the information processing apparatus 200 can execute the issuance processes safely. Besides, the arrangement of an IC chip included in an information processing apparatus according to the second embodiment of the present invention is not limited to the arrangement of the IC chip 102 shown in FIG. 11.

[Reader/Writer 400]

The reader/writer 400 includes a modulating unit 402, a first communication unit 404, a demodulating unit 406, a control unit 408, and a second communication unit 410.

The reader/writer 400 may also include a ROM (not shown), a RAM (not shown), a storage (not shown), etc. For example, the reader/writer 400 may connect its components to each other via a bus as a transmission path for data. The ROM (not shown) is provided for storing data for control, such as programs, operating parameters, etc. to be used by the control unit 408. The RAM (not shown) is provided for temporarily storing programs to be executed by the control unit 408, for example. The storage (not shown) is provided for storing data, applications, etc. to be used by the reader/writer 400. The storage (not shown) may be a magnetic storage medium, such as a Hard Disk, or a non-volatile memory, such as a flash memory, for example. However, it is not limited thereto.

The modulating unit 402 is controlled by the control unit 408 to generate a carrier signal, for example, in response to an instruction to generate the carrier signal, which instruction is sent from the control unit 408. For example, the modulating unit 402 may include a modulating circuit (not shown) for ASK modulating and an amplifier, though it is not limited to such arrangement.

The first communication unit 404 sends a carrier according to the carrier signal generated to the modulating unit 402, and receives a response signal from the information processing apparatus 200. For example, the first communication unit may include a resonant circuit that includes a capacitor of a predetermined capacitance and a coil (inductor) L1 of a predetermine inductance for an antenna, though the arrangement of the communication antenna is not limited thereto. The resonant frequency of the resonant circuit could be adjusted to the frequency of the transmission waves, such as 13.56 MHz, for example.

The demodulating unit 406 performs envelope detection on the change in the amplitude of the voltage at the antenna end of the first communication unit 404 and converts a detected signal into a binary signal; thereby the response signal from the information processing apparatus 200 is demodulated.

For example, the control unit 408 includes an MPU and an integrated circuit in which various circuits are integrated, such as a cryptographic processing circuit, to control the entire reader/writer 400 and to execute various processes, such as processes related to communication between the reader/writer 400 and the external apparatuses, such as the administrative server 300, via the network 500.

In addition, the control unit 408 also includes a first communication processing unit 412 for executing processes related to communication under the first communication protocol and a second communication processing unit 414 for executing processes related to communication under the second communication protocol.

The first communication processing unit 412 takes a role of executing the processes related to communication between the reader/writer 400 and the information processing apparatus 200/administrative server 300 via the first communication path. For example, the processes executed by the first communication processing unit 412 may be relaying communication between the information processing apparatus 200 and the administrative server 300 on the first communication path, though they are not limited thereto. More specifically, for example, the first communication processing unit 412 may forward the response signal, which is sent from the information processing apparatus 200 and demodulated by the demodulating unit 406, from the second communication unit

410 to the administrative server 300 via the first communication path. Moreover, for example, the first communication processing unit 412 may generate an instruction to generate a carrier signal under the first communication protocol in response to the instruction to write the second encryption key K2, which instruction is sent from the administrative server 300 and received by the second communication unit 410 with the second encryption key K2 contained therein. And then, the first communication processing unit 412 may send the generated instruction to the modulating unit 402. By such processes described above, for example, the first communication processing unit 412 can relay communication between the information processing apparatus 200 and the administrative server 300 via the first communication path.

The second communication processing unit 414 takes a role of executing the processes related to communication between the reader/writer 400 and the information processing apparatus 200/administrative server 300 via the second communication path. For example, the processes executed by the second communication processing unit 414 may be relaying communication between the information processing apparatus 200 and the administrative server 300 on the second communication path, though they are not limited thereto. More specifically, for example, the second communication processing unit 414 may forward the response signal, which is sent from the information processing apparatus 200 and demodulated by the demodulating unit 406, from the second communication unit 410 to the administrative server 300 via the second communication path. Moreover, for example, the second communication processing unit 414 may generate an instruction to generate a carrier signal under the second communication protocol in response to various instructions (e.g., instructions on the issuance processes), which are sent from the administrative server 300 and received by the second communication unit 410. And then, the second communication processing unit 414 may send the generated instruction to the modulating unit 402. By such processes described above, for example, the second communication processing unit 414 can relay communication between the information processing apparatus 200 and the administrative server 300 via the second communication path.

By the control unit 408 including the first communication processing unit 412 and the second communication processing unit 414, the information processing apparatus 200 and the administrative server 300 can communicate with each other via the first or second communication path.

The second communication unit 410 is included in the reader/writer 400 as means for wireless/wired communication with the external apparatuses, such as the administrative server 300, via the network 500 (or directly). For example, the second communication unit 410 may be a set of a communication antenna and an RF circuit (for wireless communication) or a set of a LAN terminal and transmitting/receiving circuit (for wired communication), though it is not limited thereto.

By the reader/writer 400 arranged as shown in FIG. 11, for example, the information processing apparatus 200 and the administrative server 300 can communicate with each other via the first or second communication path.

[Specific Example of Processes in Information Processing System 2000 According to Second Embodiment]

Figure 13:
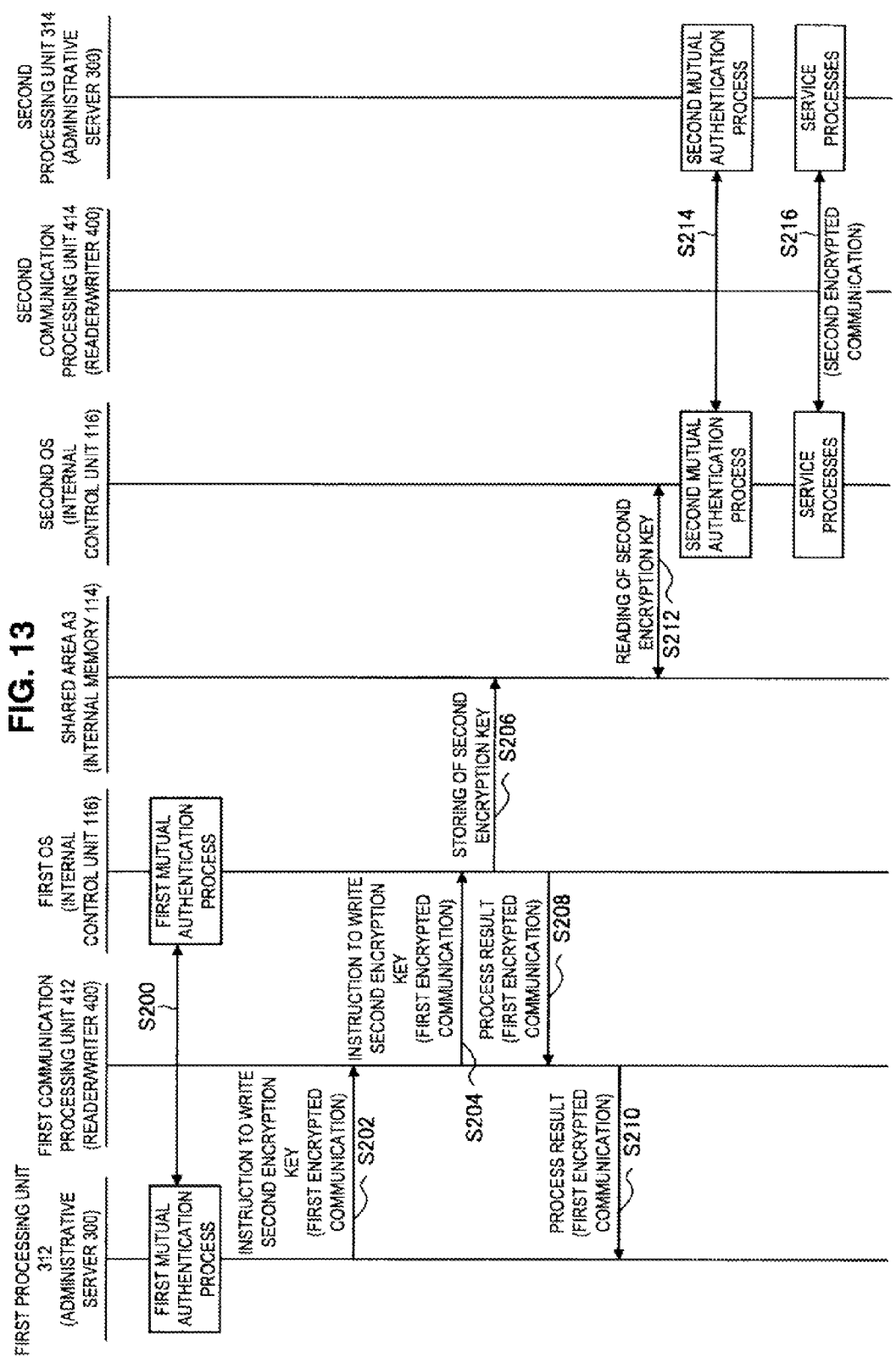
FIG. 13 is an illustration that shows exemplary processes in the information processing system according to the second embodiment.

Next, there will be described more specifically the processes in the information processing system 2000 according to the second embodiment. FIG. 13 is an illustration that shows exemplary processes in the information processing system 2000 according to the second embodiment. The exemplary processes shown in FIG. 13 are executed amongst the information processing apparatus 200, the administrative server 300, and the reader/writer 400. Besides, FIG. 13 shows part of the arrangements of the information processing apparatus 200, the administrative server 300; and the reader/writer 400, and processes executed by the rest of the components are not shown for simplicity.

The first processing unit 312 of the administrative server 300 and the first OS run by the internal control unit 116 of the information processing apparatus 200 communicate with each other through the first communication processing unit 412 of the reader/writer 400. The first processing unit 312 and the first OS then mutually authenticate each other, as in step S100 in FIG. 10 (S200: First Mutual Authentication Process). When the mutual authentication has been successfully completed at step S200, the processes related to the encryption key setting-up approach will be started between the information processing apparatus 200 and the administrative server 300.

Upon successful completion of the first mutual authentication at step S200, the first processing unit 312 sends (S202), by the first encrypted communication, an instruction to write the second encryption key K2, which is included in the instruction to be set up.

The first communication processing unit 412 receives the instruction sent from the first processing unit 312 at step S202, and sends the received instruction to the information processing apparatus 200 (S204).

As step S104 in FIG. 10, the first OS receives the instruction sent from the first communication processing unit 412 at step S202, and stores the second encryption key K2 into the shared area A3 of the internal memory 114 (S206). Then, the first OS sends the process result of the step S206 to the first communication processing unit 412 (S208). As step S106 in FIG. 10, if the second encryption key K2 has not successfully received, for example, the first OS may send a resend request, as the process result, for resending the second encryption key K2.

The first communication processing unit 412 receives the process result sent from the first OS at step S208, and sends the process result to the first processing unit 312 (S210).

As step S108 in FIG. 10, the second OS run by the internal control unit 116 of the information processing unit 200 reads the second encrypted key K2 stored in the shared area A3, and store it into the second data area A2 (S212). In the example shown in FIG. 13, the process of step S212 is executed by the second OS after the processes of step S208 and S210 is executed by the first OS and the first communication processing unit 412, though the order is not limited thereto. The process of step S212 may executed before the process of step S208 or between the process of step S208 and the process of step 210 because the first and second OSs can execute their processes independently.

When the encryption key K2 is transferred to the second data area A2 at step S212, the second OS and the second processing unit 314 of the administrative server 300 communicate with each other through the second communication processing unit 414 of the reader/writer 400 via the second communication path. And then, as step S110 in FIG. 10, the second OS and the second processing unit 314 mutually authenticate each other by use of the second encryption key K2 (S214: Second Mutual Authentication Process).

Then, as step S112 in FIG. 10, upon successful completion of the second mutual authentication at step S214, by the second encrypted communication, the second processing unit 314 and the second OS execute processes related to the services to be provided by the administrative server 300 (S216: Service Processes).

In the information processing system 2000 according to the second embodiment, the above-described encryption key setting-up approach as shown in FIG. 12A to FIG. 12C is implemented by the processes shown in FIG. 13, for example. Besides, it should be appreciated that the processes in the information processing system according to the second embodiment are not limited to the example shown in FIG. 13.

As described above, the information processing system 2000 according to the second embodiment includes the information processing apparatus 200, the administrative server 300, and the reader/writer 400, where the information processing apparatus 200 and the administrative server 300 communicate with each other through the reader/writer 400. Now, the difference of the information processing system 2000 from the information processing system 1000 according to the first embodiment can be found in the way of communication, where the information processing apparatus 200 and the administrative server 300 communicates with each other through the reader/writer 400. However, the processes in the information processing system 2000 are basically similar to the processes in the information processing system 1000 according to the first embodiment. Accordingly, the information processing apparatus 200 can acquires the second encryption key K2 safely, as the information processing apparatus 100 according to the first embodiment, by non-contact communication with the administrative server 300 through the reader/writer 400. Then, with the information processing apparatuses 200, the administrative server 300, and the reader/writer 400 included therein, the information processing system 2000 is achieved for setting up encryption keys safely via non-contact communication.

Furthermore, as the information processing apparatus 100 according to the first embodiment, the information processing apparatus 200 can encrypt the second communication path by use of the set-up second encryption key K2 for the second encrypted communication with the external apparatus through the reader/writer 400. Thus, the information processing system 2000 can safely conduct new issuance processes for the second data area for the second OS, by the information processing apparatus 200 and the administrative server 300 for managing the issuance processing in the second encrypted communication with each other through the reader/writer 400.

The information processing apparatus 200 has been described above as an exemplary component included in the information processing system 2000 according to the second embodiment, though the embodiments are not limited to the embodiment described above. The embodiments may be applied to various machines: for example, portable communication tools, such as an IC card, a mobile phone, etc.; video/audio players, such as a WALK MAN®; portable game machines, such as a PlayStation Portable®; and computers, such as a laptop PC.

And, the administrative server 300 has been described as a component included in the information processing system 2000 according to the second embodiment, though the embodiments are not limited to the embodiment described above. The embodiments of the present invention may be applied to various machines: for example, computers, such as a PC, a server, etc.

And, the reader/writer 400 has been described as a component included in the information processing system 2000 according to the second embodiment, though the embodiments are not limited to the embodiment described above. The embodiments may be applied to various machines: for example, reader/writers; portable communication tools, such as a mobile phone, with the reader/writer function (i.e., function of sending a carrier subjectively); and computers, such as a PC, a server, etc. with the reader/writer function.

(Program According to Second Embodiment)

By a program for cause a computer to function as the information processing apparatus according to the second embodiment, encryption keys may be set up safely via non-contact communication between the computer and an external apparatus.

(Information Processing System According to Third Embodiment)

As described above, the information processing system 2000 according to the second embodiment includes an information processing apparatus, an administrative server, and a reader/writer, where the information processing apparatus and the administrative server can communicate with each other through the reader/writer. However, the arrangement of such an information processing system is not limited the arrangement of the information processing system 2000. Then, there will be described next an information processing system 3000 according to the third embodiment, in which an information processing apparatus and an administrative server can communicate with each other via a reader/writer.

Figure 14:
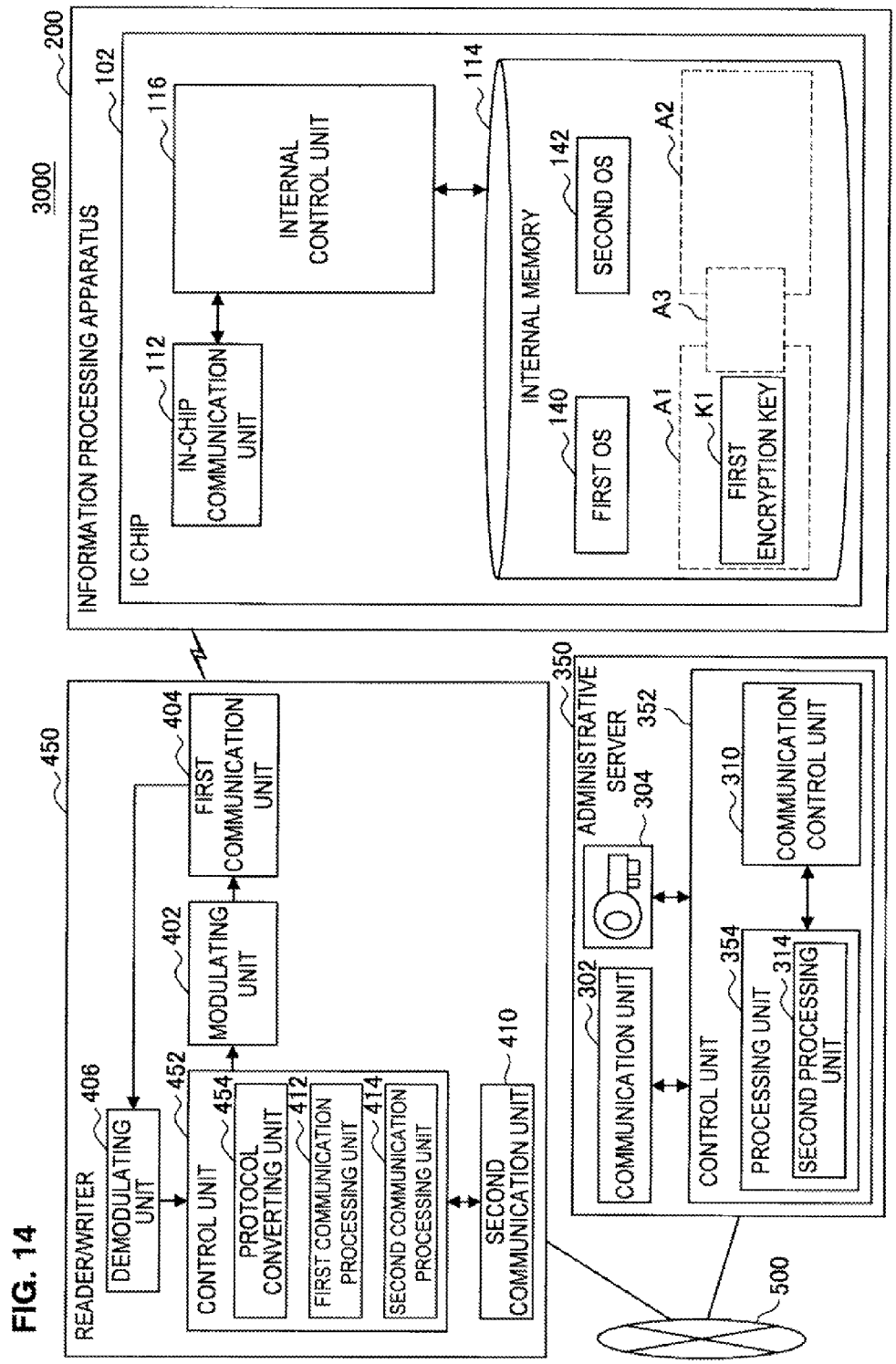
FIG. 14 is an illustration that shows an exemplary arrangement of an information processing system according to the third embodiment.

FIG. 14 is an illustration that shows an exemplary arrangement of the information processing system 3000 according to the third embodiment. In FIG. 14, the information processing system 3000 includes an information processing apparatus 200, an administrative server 350, and a reader/writer 450, where the administrative server 350 and the reader/writer 450 are connected to each other via a network 500. As in the information processing system 2000 according to the second embodiment, the information processing apparatus 200 and the reader/writer 450 may be in non-contact communication with each other via transmission waves at a particular frequency, such as 13.56 MHz, for example. Besides, in FIG. 14, the information processing system 3000 includes the information processing apparatus 200 arranged similarly to the information processing apparatus 200 in FIG. 11, though the arrangement of an information processing apparatus included in the information processing system 3000 is not limited thereto. For example, an information processing system according to the third embodiment may be arranged to include the information processing apparatus 100 shown in FIG. 6, as the information processing system according to the second embodiment. The information processing apparatus 200 included in the information processing system 3000 will not be described in detail here since it may be arranged similarly to the information processing apparatus 200 included in the information processing system 2000 according to the second embodiment.

[Overview of Processes in Information Processing System 3000 According to Third Embodiment]

Before the arrangements of the administrative server 350 and the reader/writer 450 included in the information processing system 3000, there will be described an overview of the processes related to setting-up of encryption keys in the information processing system 3000.

FIG. 15A to FIG. 15C are illustrations for illustrating the overview of the processes related to setting-up of the encryption keys in the information processing system 3000 according to the third embodiment. FIG. 15A to FIG. 15C show the processes in the chronological order of: FIG. 15A-FIG. 15B-FIG. 15C.

[3-1] First Process (FIG. 15A)

The first OS and the administrative server 350 of the information processing apparatus 200 communicate with each other via first and second communication paths, with the communication protocol converted selectively by the reader/ writer 450. For example, a signal encrypted with a first encryption key K1 sent from the information processing apparatus 200 is converted, by the reader/writer 450, into a signal compatible with a second communication protocol for the second communication path. The signal encrypted with the first encryption key K1 under the second communication protocol is then sent from the administrative server 300, and converted, by the reader/writer 450, into a signal compatible with the first communication protocol for the first communication path. The signal is then sent to the information processing apparatus 200 via the first communication path.

[3-2] Second Process (FIG. 15B)

The first OS acquires a second encryption key K2 from the administrative server 350 through the reader/writer 450 by encrypted communication, and stores the acquired second encryption key K2 into a shared area A3.

[3-3] Third Process (FIG. 15C)

The second OS transfers the second encryption key K2 stored in the shared area A3 to a second data area, and communicates with the administrative server 350 through the reader/writer 450 via a second communication path encrypted with the second encryption key K2 transferred to the second data area. At this point, the reader/writer 450 does not convert the communication protocol for communication between the information processing apparatus 200 and the administrative server 350. Besides, the second data area is not shown in FIG. 15C for simplicity.

In the information processing system 3000, the processes shown in FIG. 15A to FIG. 15C may be executed between the information processing apparatus 200 and the administrative server 350, for example. Now, by comparison with FIG. 12A to FIG. 12C, it can be seen in FIG. 15A to FIG. 15C that the processes in the information processing system 3000 according to the third embodiment is basically the same as the processes in the information processing system 2000 according to the second embodiment. The difference of the processes in the information processing system 3000 from those in the information processing system 2000 can be found in the way of communication, where the reader/writer 450 converts the communication protocol selectively. For example, the reader/writer 450 may convert the communication protocol selectively by changing the condition for converting the communication protocol in dependence upon which communication unit (first communication unit 404/second communication unit 410) has received a signal, though the way of converting the communication protocol is not limited thereto. Thus, by the processes shown in FIG. 15A to FIG. 15C, as the information processing apparatus 200 according to the second embodiment, the information processing apparatus 200 can acquire the second encryption key K2 safely from the administrative server 350. Moreover, by the processes shown in FIG. 15A to FIG. 15C, as the information processing apparatus 200 according to the second embodiment, the information processing apparatus 200 can set up the acquired second encryption key K2 safely, and communicate with the administrative server 350 via the second encrypted communication by use of the set-up second encryption key K2. Consequently, as the information processing system 2000 according to the second embodiment, the information processing system 3000 can implement the above-described encryption key setting-up approach according to the embodiments.

[Exemplary Arrangement of Information Processing System 3000]

Next, there will be described the arrangement of the information processing system 3000 that can implement the processes shown in FIG. 15A to FIG. 15C. The information processing apparatus 200 will not be described in detail here since it may be arranged similarly to the information processing apparatus 200 according to the second embodiment.

[Administrative Server 350]

Basically, the administrative server 350 is arranged similarly to the administrative server 300 according to the first embodiment shown in FIG. 8. Now, the difference of the administrative server 350 from the administrative server 300 according to the first embodiment can be found in its components, where the processing unit 354 included in the control unit 352 of the administrative server 350 does not include a component such as the first processing unit 312 of the administrative server 300 according to the first embodiment. In other words, the administrative server 300 according to the first embodiment is capable of communication over both of the first and second communication paths, whilst the administrative server 350 communicate with the external apparatuses via the second communication path, not via the first communication path.

[Reader/Writer 450]

Basically, the reader/writer 450 is arranged similarly to the reader/writer 400 according to the second embodiment shown in FIG. 11. Now, the difference of the reader/writer 450 from the reader/writer 400 according to the second embodiment can be found in its components, where the control unit 452 of the reader/writer 450 further includes a protocol converting unit 454.

The protocol converting unit 454 selectively converts a communication protocol for a response signal, which is sent from the information processing apparatus 200 and demodulated by the demodulating unit 406. The protocol converting unit 454 also selectively converts a communication protocols for various signals, which are sent from the administrative server 350 and received by the second communication unit 410. For example, the protocol converting unit 454 may convert the communication protocols, based upon a determination result whether a signal to be processed meets a predetermined condition or upon an indicator for indicating whether any conversion has been made, which indicator contained in the header of the signal to be processed. However, the basis of conversion is not limited thereto. The predetermined condition for the above-mentioned determination may be, for example, that the response signal passed by the demodulating unit 406 is a signal under the first communication protocol. If the above condition is satisfied, for example, the protocol converting unit 454 will convert the communication protocol.

By the reader/writer 450 arranged as shown in FIG. 14, for example, the information processing apparatus 200 and the administrative server 350 can communicate with each other via the first or second communication path.

[Specific Example of Processes in Information Processing System 3000 According to Third Embodiment]

Next, there will be described more specifically the processes in the information processing system 3000 according to the third embodiment. FIG. 16 is an illustration that shows exemplary processes in the information processing system 3000 according to the third embodiment of the present invention. The exemplary processes shown in FIG. 16 are executed amongst the information processing apparatus 200, the administrative server 350, and the reader/writer 450. Besides, FIG. 16 shows part of the arrangements of the information processing apparatus 200, the administrative server 350; and the reader/writer 450, and processes executed by the rest of the components are not shown for simplicity.

The second processing unit 314 of the administrative server 350 send an authentication request for mutual authentication to the reader/writer 450. At this point, the authentication request sent from the second processing unit 314 is passed through the second communication processing unit 414 of the reader/writer 450, and converted, by the protocol converting unit 454, from an authentication request under the second communication protocol into an authentication request under the first communication protocol. The request is then transferred to the first communication processing unit 412 of the reader/writer 450 (S300). The conversion processes shown in FIG. 16 mean the conversions of communication protocols, which conversions are performed by the protocol converting unit 454.

Upon reception of the authentication request sent from the second processing unit 314 at step S300, the first communication processing unit 412 sends the authentication request to the information processing apparatus 200 via the first communication path (S302).

Upon reception of the authentication request sent from the first communication processing unit 412 at step S302, the first OS of the information processing apparatus 200 executes an authentication process (S304), and sends the process result of the authentication process to the reader/writer 450 (S306).

The first communication processing unit receives the process result sent from the first OS at step S306, and sends the process result to the second processing unit 314 through the second communication processing unit 414 via the second communication path (S308).

The second processing unit 314 receives the process result sent from the first communication processing unit 412 at step S308, and execute an authentication process (S310). In FIG. 16, processes of steps S300-S310 corresponds to the first mutual authentication process. In the information processing system 3000, when the mutual authentication through steps S300-S310 has been successfully completed, the processes related to the encryption key setting-up approach will be started between the information processing apparatus 200 and the administrative server 350.

Upon successful completion of the first mutual authentication at step S310, the second processing unit 314 sends (S312), by the first encrypted communication, an instruction to write the second encryption key K2, which is included in the instruction to be set up.

The first communication processing unit 412 receives the instruction sent from the second processing unit 314 at step S312, and sends the received instruction to the information processing apparatus 200 (S314).

As step S104 in FIG. 10, the first OS receives the instruction sent from the first communication processing unit 412 at step S314, and stores the second encryption key K2 into the shared area A3 of the internal memory 114 (S316). Then, as step S208 in FIG. 13, the first OS sends the process result of the step S316 to the first communication processing unit 412 (S318).

The first communication processing unit 412 receives the process result sent from the first OS at step S318, and sends the process result to the first processing unit 312 through the second communication processing unit 414 (S320).

As step S212 in FIG. 13, the second OS run by the internal control unit 116 of the information processing unit 200 reads the second encrypted key K2 stored in the shared area A3, and store it into the second data area A2 (S322).

When the encryption key K2 is transferred to the second data area A2 at step S322, the second OS and the second processing unit 314 of the administrative server 350 communicate with each other through the second communication processing unit 414 of the reader/writer 400 via the second communication path. And then, as step S110 in FIG. 10, the second OS and the second processing unit 314 mutually authenticate each other by use of the second encryption key K2 (S324: Second Mutual Authentication Process).

Then, as step S112 in FIG. 10, upon successful completion of the second mutual authentication at step S324, by the second encrypted communication, the second processing unit 314 and the second OS execute processes related to the services to be provided by the administrative server 300 (S326: Service Processes).

In the information processing system 3000 according to the second embodiment, the above-described encryption key setting-up approach as shown in FIG. 15A to FIG. 15C is implemented by the processes shown in FIG. 16, for example. Besides, it should be appreciated that the processes in the information processing system according to the third embodiment is not limited to the example shown in FIG. 16.

As described above, the information processing system 3000 according to the third embodiment includes the information processing apparatus 200, the administrative server 350, and the reader/writer 450, where the information processing apparatus 200 and the administrative server 350 communicate with each other through the reader/writer 450. Now, the difference of the information processing system 3000 from the information processing system 2000 according to the second embodiment can be found in its communication protocol, where the reader/writer 450 converts the communication protocol selectively. However, the processes in the information processing system 3000 are basically similar to the processes in the information processing system 2000 according to the second embodiment. Accordingly, the information processing apparatus 200 can acquires the second encryption key K2 safely, as the information processing apparatus 200 according to the second embodiment, by non-contact communication with the administrative server 350 through the reader/writer 450. Then, with the information processing apparatuses 200, the administrative server 350, and the reader/writer 450 included therein, the information processing system 3000 is achieved for setting up encryption keys safely via non-contact communication.

Furthermore, as the information processing apparatus 100 according to the first embodiment, the information processing apparatus 200 can encrypt the second communication path by use of the set-up second encryption key K2 for the second encrypted communication with the external apparatus through the reader/writer 450. Thus, the information processing system 3000 can safely conduct new issuance processes for the second data area for the second OS, by the information processing apparatus 200 and the administrative server 350 for managing the issuance processing in the second encrypted communication with each other through the reader/writer 450.

The information processing apparatus 200 has been described above as an exemplary component included in the information processing system 3000 according to the third embodiment, though the embodiments are not limited to the embodiment described above. The embodiments may be applied to various machines: for example, portable communication tools, such as an IC card, a mobile phone, etc.; video/audio players, such as a WALK MAN®; portable game machines, such as a PlayStation Portable®; and computers, such as a laptop PC.

And, the administrative server 350 has been described as a component included in the information processing system 3000 according to the third embodiment, though the embodiments are not limited to the embodiment described above. The embodiments may be applied to various machines: for example, computers, such as a PC, a server, etc.

And, the reader/writer 450 has been described as a component included in the information processing system 3000 according to the third embodiment, though the embodiments are not limited to the embodiment described above. The embodiments may be applied to various machines: for example, reader/writers; portable communication tools, such as a mobile phone, with the reader/writer function (i.e., function of sending a carrier subjectively); and computers, such as a PC, a server, etc. with the reader/writer function.

(Program According to Third Embodiment)

By a program for cause a computer to function as the information processing apparatus according to the third embodiment, encryption keys may be set up safely via non-contact communication between the computer and an external apparatus.

As described above, programs (computer programs) cause a computer to function as the information processing apparatus 100/200 according to the embodiments can be provided. In addition, a storage medium in which the above programs are stored can be provided as well according to the embodiments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a communication unit for communication with an external apparatus;
an operating system running unit for running a first operating system and a second operating system, respectively, the first operating system processing the communication with the external apparatus via a first communication path formed under a first communication protocol, the second operating system processing the communication with the external apparatus via a second communication path formed under a second communication protocol; and
a storage including a first data area from and into which the first operating system is allowed to read and write data, a second data area from and into which the second operating system is allowed to read and write data, and a shared area from and into which both of the first and second operating systems are allowed to independently read and write data, wherein a first encryption key is stored in the first data area for use in a first encrypted communication under the first communication protocol,
wherein the first operating system encrypts the communication with the external apparatus via the first communication path by use of the first encryption key stored in the first data area, acquires, from the external apparatus via the first communication path, a second encryption key for use in a second encrypted communication under the second communication protocol, and stores the acquired second encryption key into the shared area that is independently accessible by the first operating system and the second operating system, and
wherein the second operating system transfers the second encryption key, which has been previously stored in the shared area by the first operating system, to the second data area independently of the first operating system.

2. The information processing apparatus according to claim 1, wherein the second operating system encrypts the communication with the external apparatus via the second communication path by use of the second encryption key transferred to the second data area and communicates with the external apparatus via the second communication path.

3. The information processing apparatus according to claim 2, wherein the second operating system sends a request for an issuance process to the external apparatus via the second communication path, so that the second data area is initialised to be available for a service.

4. The information processing apparatus according to claim 1, wherein a first key length of the first encryption key is longer than a second key length of the second encryption key.

5. The information processing apparatus according to claim 1, wherein the information processing apparatus is a portable communication apparatus.

6. The information processing apparatus according to claim 1, wherein the information processing apparatus is an IC card.

7. An information processing method comprising:
running a first operating system and a second operating system, respectively, the first operating system processing communication with an external apparatus via a first communication path formed under a first communication protocol, the second operating system processing the communication with the external apparatus via a second communication path formed under a second communication protocol; and
acquiring, from the external apparatus via the first communication path, a second encryption key for use in a second encrypted communication under the second communication protocol by encrypting the communication with the external apparatus via the first communication path by use of a first encryption key under the first communication protocol, the first encryption key stored in a storage including
a first data area from and into which the first operating system is allowed to read and write data,
a second data area from and into which the second operating system is allowed to read and write data, and
a shared area from and into which both of the first and second operating systems are allowed to independently read and write data, wherein the first encryption key is stored in the first data area;
storing the acquired second encryption key into the shared area that is independently accessible by the first operating system and the second operating system; and
transferring the second encryption key, which has been previously stored in the shared area by the first operating system, to the second data area independently of the first operating system.

8. A non-transitory computer readable memory including executable instructions that when executed by a processor performs steps for:
running a first operating system and a second operating system, respectively, the first operating system processing communication with an external apparatus via a first communication path formed under a first communication protocol, the second operating system processing the communication with the external apparatus via a second communication path formed under a second communication protocol; and
acquiring, from the external apparatus via the first communication path, a second encryption key for use in a second encrypted communication under the second communication protocol by encrypting the communication with the external apparatus via the first communication path by use of a first encryption key under the first communication protocol, the first encryption key stored in a storage including
a first data area from and into which the first operating system is allowed to read and write data,
a second data area from and into which the second operating system is allowed to read and write data, and
a shared area from and into which both of the first and second operating systems are allowed to independently read and write data, wherein the first encryption key is stored in the first data area;
storing the acquired second encryption key into the shared area that is independently accessible by the first operating system and the second operating system; and
transferring the second encryption key, which has been previously stored in the shared area by the first operating system, to the second data area independently of the first operating system.

9. An information processing system comprising:
a reader/writer;
an administrative server operable to communicate with the reader/writer via a first communication path formed under a first communication protocol and a second communication path formed under a second communication protocol; and
an information processing apparatus operable to communicate with the reader/writer via the first and second communication paths,
wherein the administrative server includes
an administrative communication unit for communication between the administrative server and the reader/writer and
an administrative storage for storing a first encryption key for a first encrypted communication under the first communication protocol and a second encryption key for a second encrypted communication under the second communication protocol,
wherein the information processing apparatus includes
a communication unit for non-contact communication between the information processing apparatus and the reader/writer by use of a carrier at a predetermined frequency,
an operating system running unit for running a first operating system and a second operating system, respectively, the first operating system processing the non-contact communication via the first communication path, the second operating system processing the non-contact communication via the second communication path, and
a storage including a first data area from and into which the first operating system is allowed to read and write data, a second data area from and into which the second operating system is allowed to read and write data, and a shared area from and into which both of the first and second operating systems are allowed to independently read and write data, wherein the first encryption key is stored in the first data area,
wherein the first operating system encrypts the communication with the external apparatus via the first communication path by use of the first encryption key stored in the first data area, acquires the second encryption key from the administrative server through the reader/writer via the first communication path, and stores the acquired second encryption key into the shared area that is independently accessible by the first operating system and the second operating system, and
wherein the second operating system transfers the second encryption key, which has been previously stored in the shared area by the first operating system, to the second data area independently of the first operating system.

* * * * *